United States Patent [19]
Glover et al.

[11] Patent Number: 5,379,297
[45] Date of Patent: Jan. 3, 1995

[54] CONCURRENT MULTI-CHANNEL SEGMENTATION AND REASSEMBLY PROCESSORS FOR ASYNCHRONOUS TRANSFER MODE

[75] Inventors: Willie T. Glover; Gururaj Singh, both of San Jose; Amar Gupta, Cupertino; Peter Newman, Mountain View, all of Calif.

[73] Assignee: Network Equipment Technologies, Inc., Redwood City, Calif.

[21] Appl. No.: 866,317

[22] Filed: Apr. 9, 1992

[51] Int. Cl.6 .......................... H04L 12/56; H04J 3/16
[52] U.S. Cl. ...................................... 370/60.1; 370/84; 370/94.2
[58] Field of Search .................... 370/60, 60.1, 79, 84, 370/94.1, 94.2

[56] References Cited
U.S. PATENT DOCUMENTS

| | | | |
|---|---|---|---|
| 4,727,536 | 2/1988 | Reeves et al. | 370/84 |
| 4,787,082 | 11/1988 | Delaney et al. | 370/94.2 |
| 4,912,702 | 3/1990 | Verbiest | 370/84 |
| 4,939,723 | 7/1990 | Harley, Jr. et al. | 370/84 |
| 4,993,024 | 2/1991 | Quinquis et al. | 370/84 |
| 5,018,136 | 5/1991 | Gollub | 370/94.1 |

*Primary Examiner*—Benedict V. Safourek
*Attorney, Agent, or Firm*—Fliesler, Dubb, Meyer & Lovejoy

[57] ABSTRACT

A communication unit for concurrently processing cells in an asynchronous transfer mode (ATM) network. Packets are segmented into a plurality of cells concurrently for a plurality of channels for transmission over the (ATM) network. Cells received from the ATM network are reassembled concurrently for the plurality of channels. Pipelined processing units are employed for segmentation and for reassembly each having logic control, control memory, and data memory. The segmentation unit control memory stores two-dimensional queues with first dimension rate queues for queueing descriptors for cells of different channels having cells to be transmitted and with second dimension channel queues for each channel having a cell descriptor in the rate queue.

68 Claims, 12 Drawing Sheets

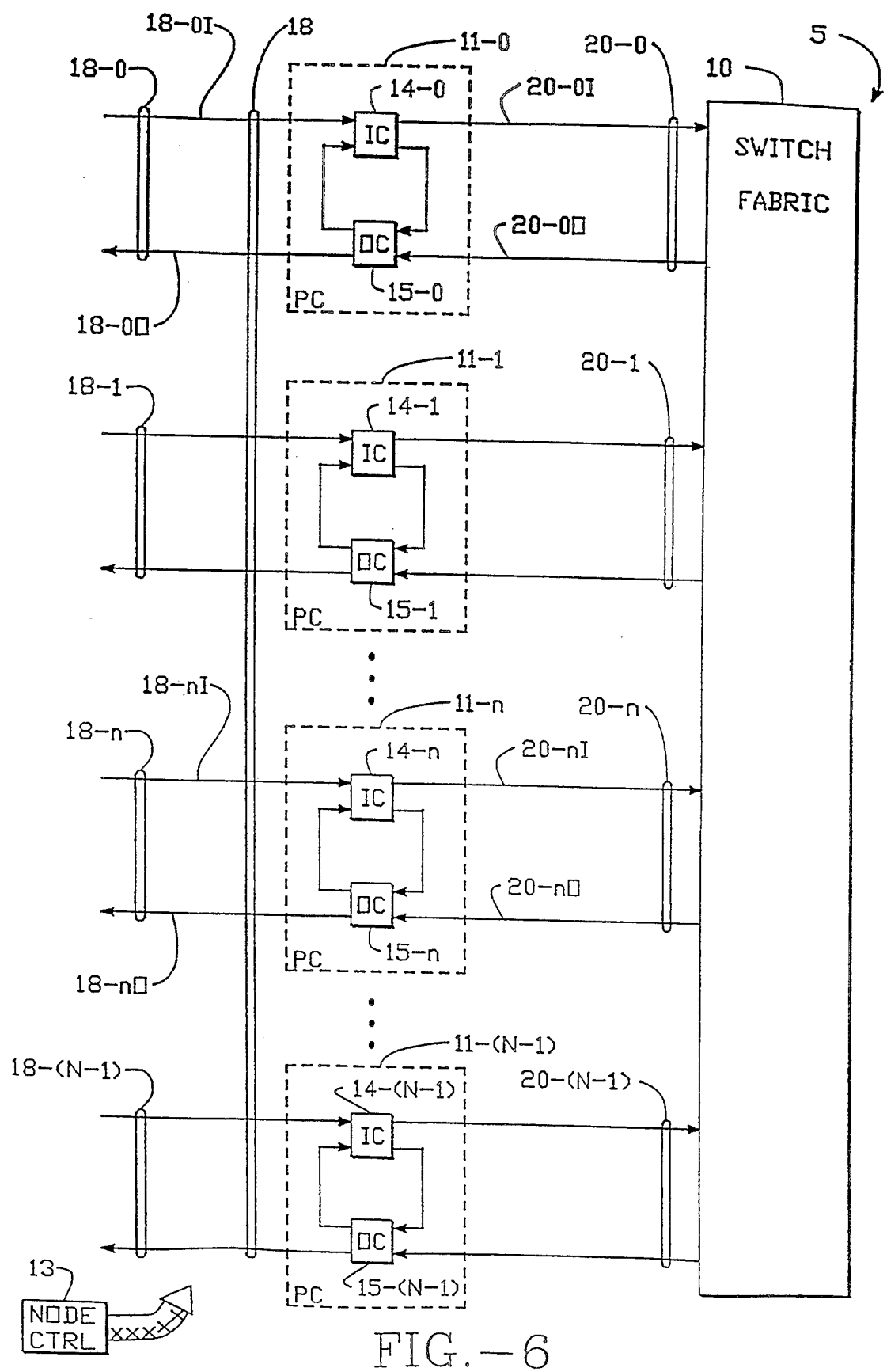
FIG.—6

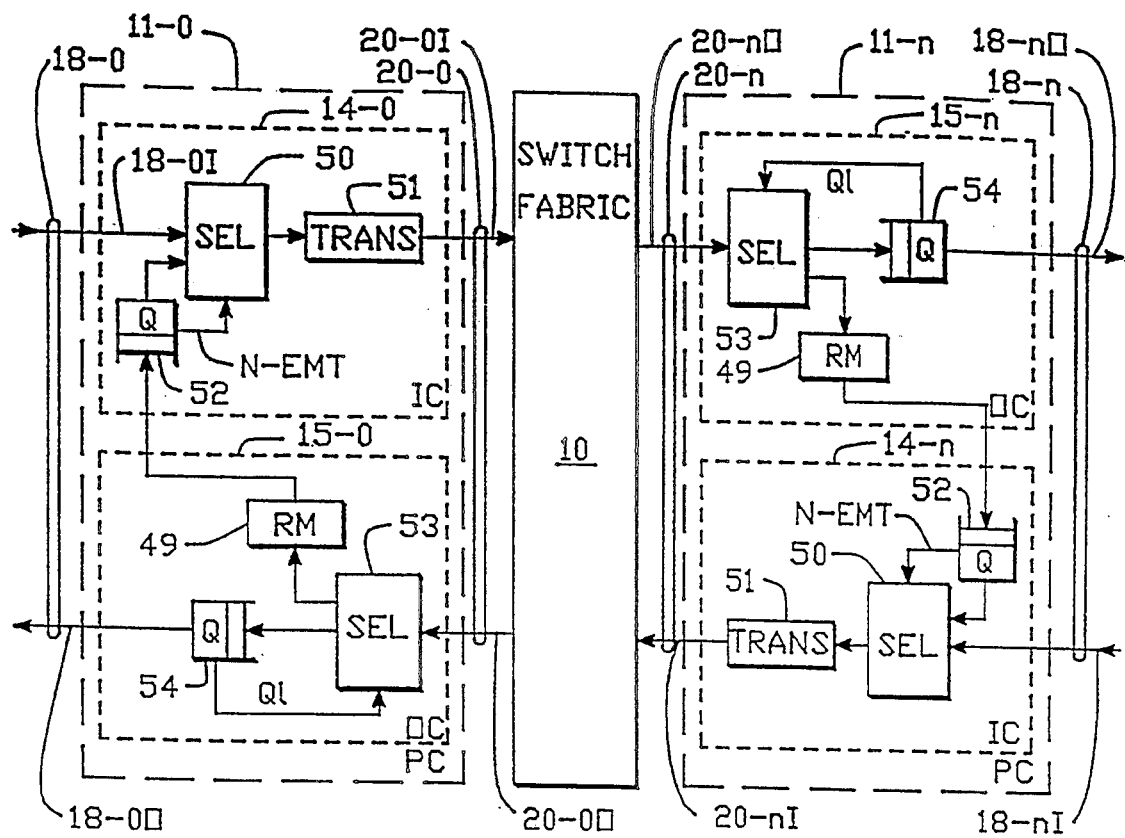
FIG.—7
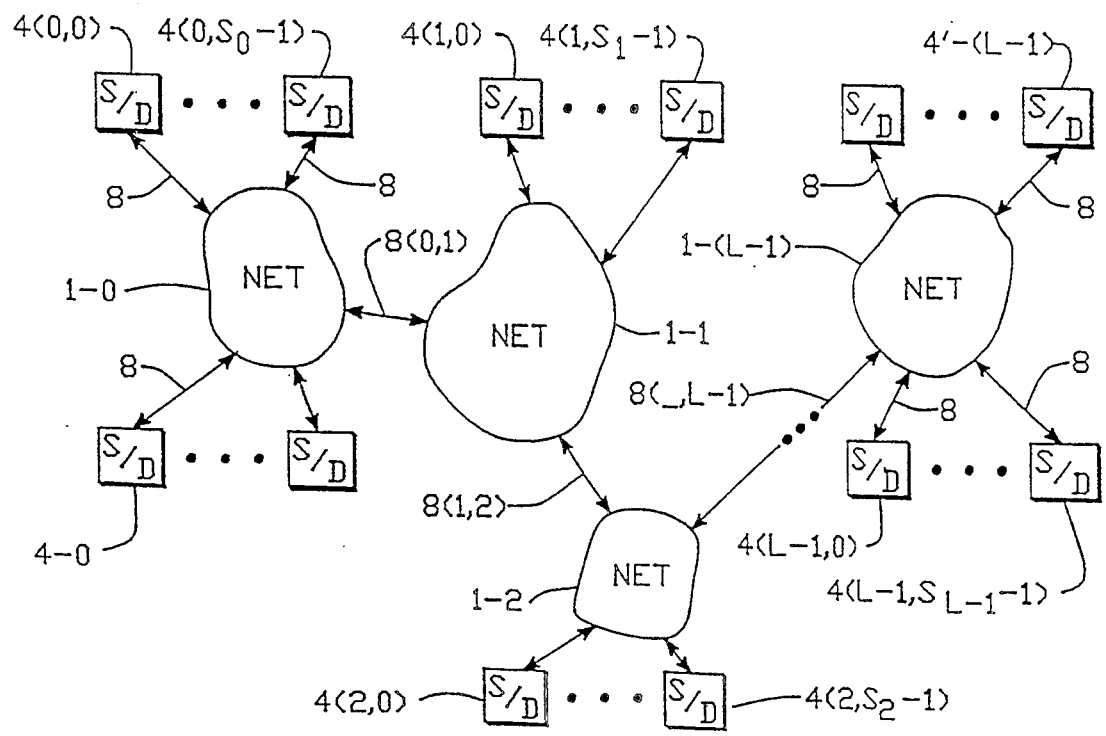
FIG.—8

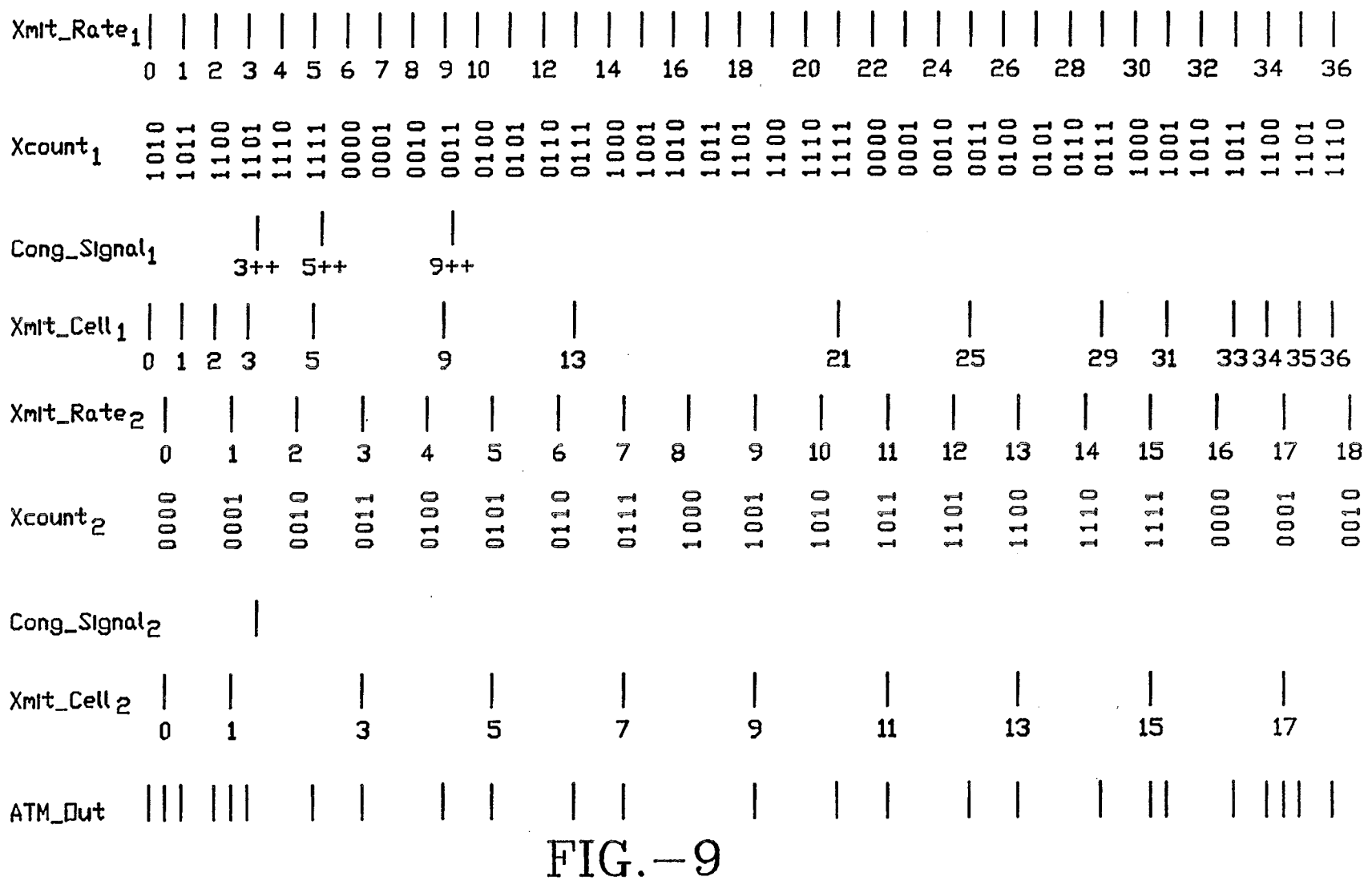

FIG.—9

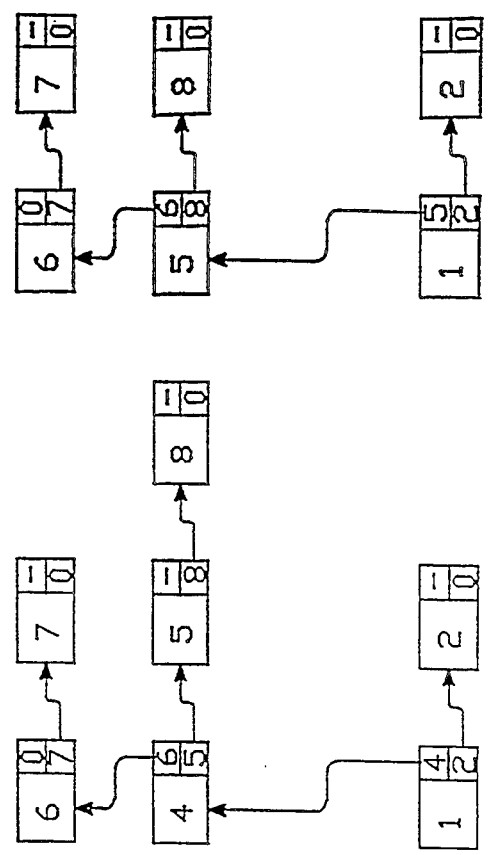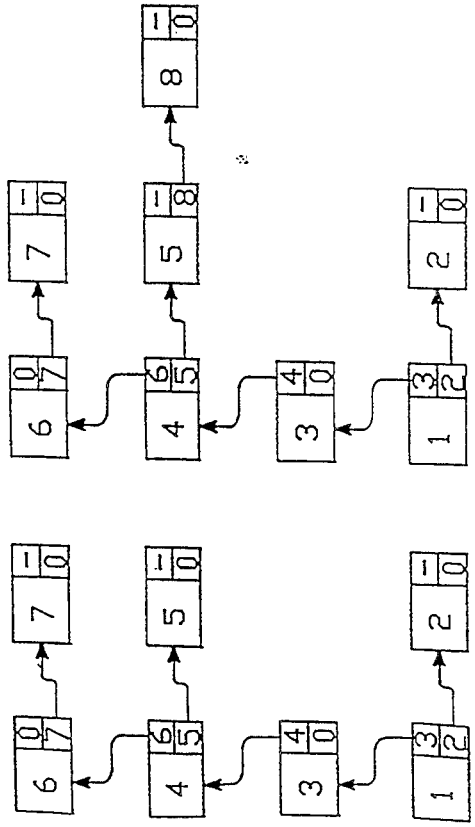

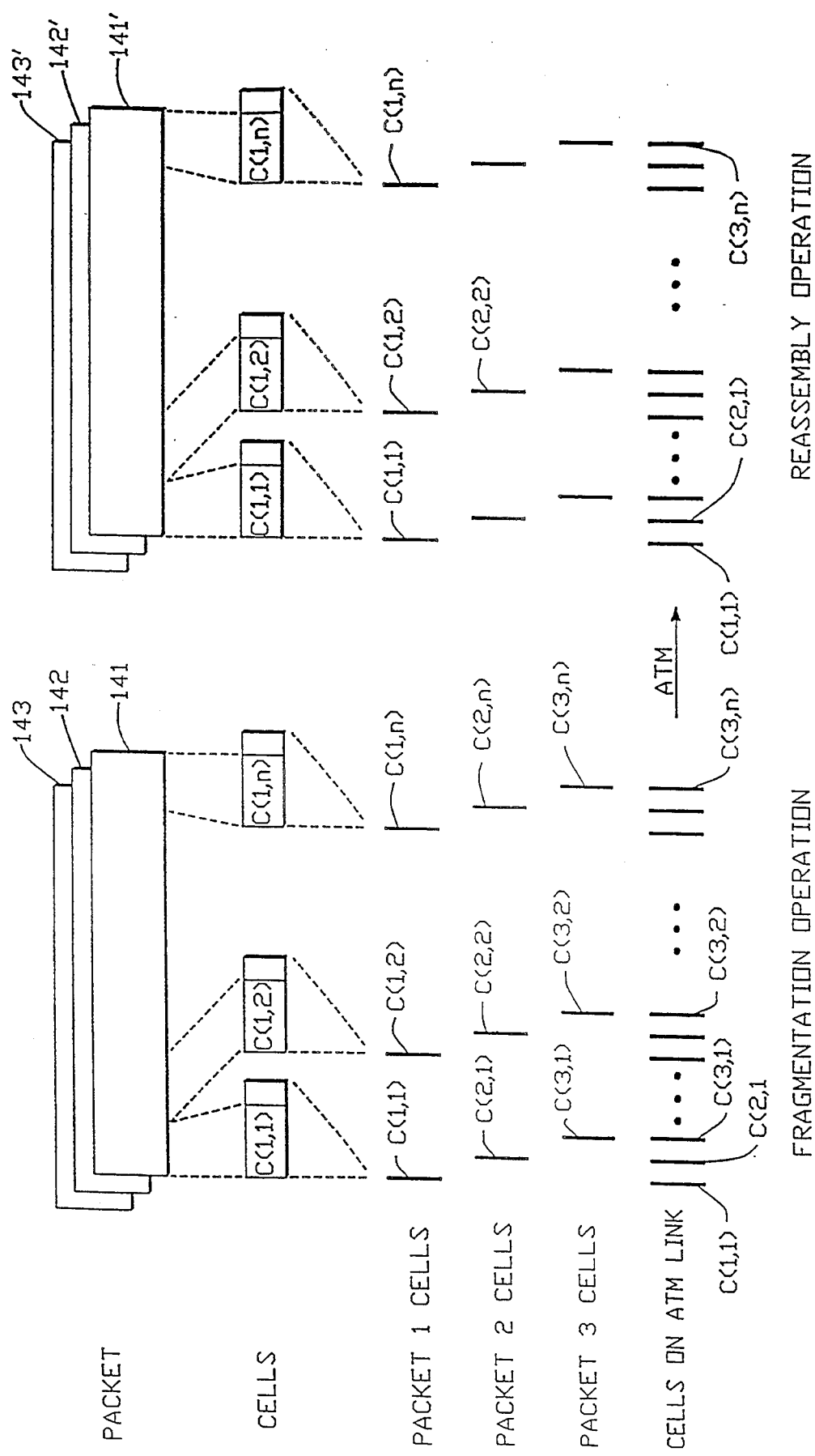

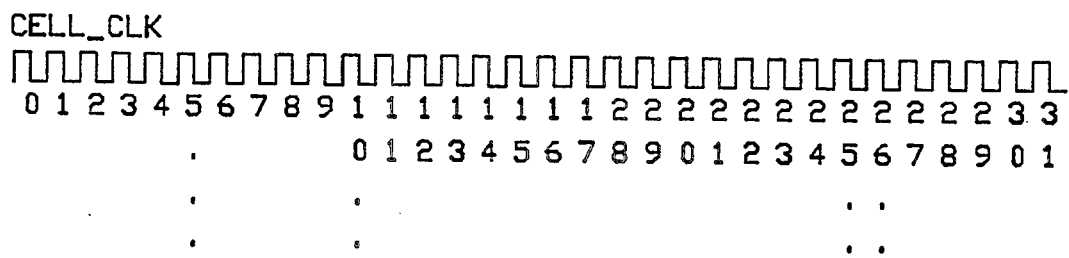
FIG.—16
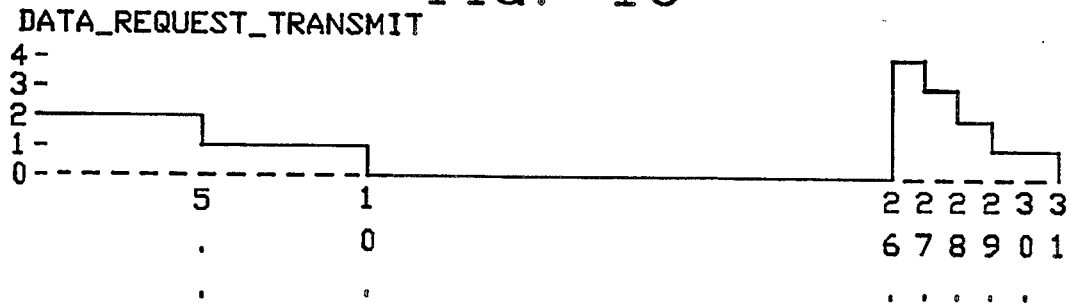
FIG.—17
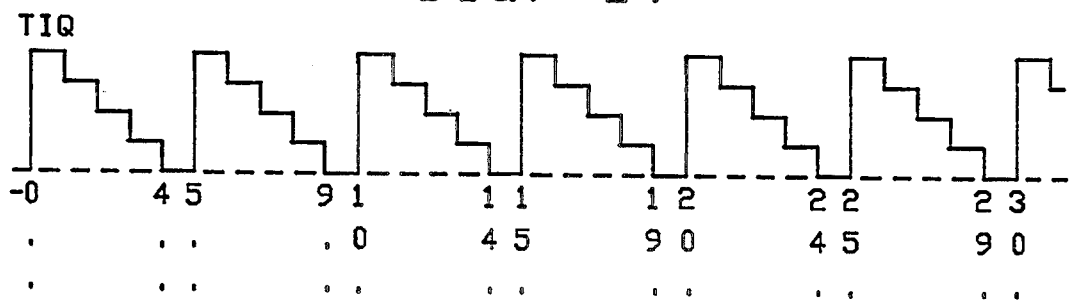
FIG.—18
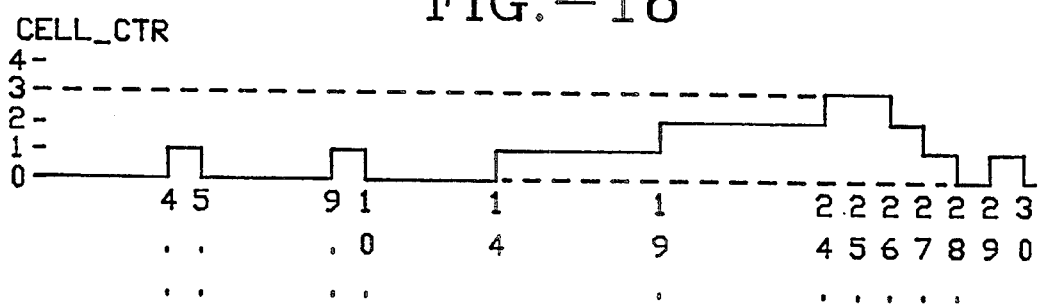
FIG.—19
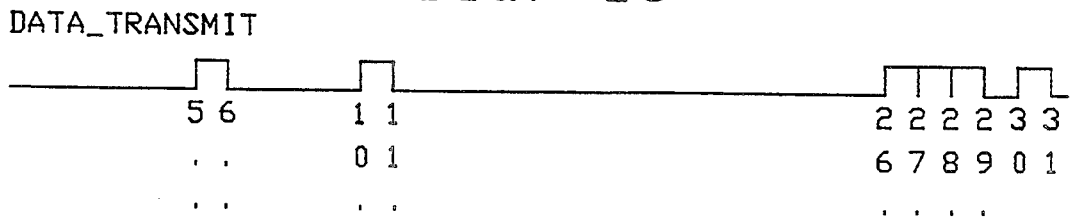
FIG.—20

CONCURRENT MULTI-CHANNEL SEGMENTATION AND REASSEMBLY PROCESSORS FOR ASYNCHRONOUS TRANSFER MODE

CROSS-REFERENCE TO RELATED APPLICATIONS

U.S. application Ser. No. 07/258,291
Filed: Oct. 14, 1988
U.S. Pat. No. 4,965,788
Title: SELF-ROUTING SWITCHING ELEMENT FOR AN ASYNCHRONOUS TIME SWITCH
U.S. application Ser. No. 07/582,254
Filed: Sep. 14, 1990
Title: SELF-ROUTING SWITCHING ELEMENT AND FAST PACKET SWITCH NOW ABANDONED
U.S. application Ser. No. 07/865,820
Filed: Apr. 1, 1992
Title: SELF-ROUTING SWITCHING ELEMENT AND FAST PACKET SWITCH NOW ABANDONED
U.S. application Ser. No. 08/033,416
Filed: Mar. 18, 1993
Title: SELF-ROUTING SWITCHING ELEMENT FOR AN ASYNCHRONOUS TIME SWITCH
U.S. application Ser. No. 07/602,409
Filed: Oct. 22, 1990
U.S. Pat. No. 5,222,085
Title: SELF-ROUTING SWITCHING ELEMENT AND FAST PACKET SWITCH
U.S. application Ser. No. 07/756,462
Filed: Sep. 9, 1991
Title: METHOD AND APPARATUS FOR REACTIVE CONGESTION CONTROL IN AN ASYNCHRONOUS TRANSFER MODE (ATM) NETWORK
NOW ABANDONED
U.S. application Ser. No. 07/866,317
Filed: Apr. 9, 1992
Title: CONCURRENT MULTI-CHANNEL SEGMENTATION AND REASSEMBLY PROCESSORS FOR ASYNCHRONOUS TRANSFER MODE (ATM)

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present invention relates to communication systems and more particularly to asynchronous transfer mode (ATM) communication networks.

A communication network functions to interconnect many network users. Each user is connected to the network at a port. Typically, the network is formed by a number of interconnected nodes where information (from a user at a source) is input at an input port, is passed by the input port from node to node through the network, and is output at an output port (to a user at a destination).

Information can be communicated through a communication network in various forms. For example, time-sensitive voice, video and circuit emulation information is typically transmitted in constant bit rate (CBR) form while computer and other non-time-sensitive information is typically packetized and conmunicated in variable bit rate (VBR) form.

In communication networks, each node switches incoming information at input ports to outgoing information at output ports. For time-sensitive information, the communication through the ATM network is in CBR (constant bit rate) form and for packetized information the communication through the ATM network is in VBR (variable bit rate) form.

Fast packet switches typically can transfer hundreds of thousands of packets per second at every switch port in a communication network. Each switch port is typically designed to transfer information at a rate from 50 Mbits/s to 600 Mbit/s for broadband integrated service digital networks (ISDN). Switch sizes range from a few ports to thousands of ports.

The term "fast packet switch" includes switches capable of handling both variable-length packets of information and fixed-length packets of information. Fixed-length packets of information are desirable since they simplify the switch design. Fast packet switches using short, fixed-length packets (called "cells") are referred to as asynchronous transfer mode (ATM) switches. ATM switches connected together form an ATM network.

For ATM networks and switches, the term "packet" refers to variable-length information. Typically, a packet is hundreds and sometimes thousands of 8-bit bytes in length. For ATM networks and switches, the term "cell" refers to short (relative to packets of maximum length), fixed-length information. Typically, a cell is 53 8-bit bytes in length.

Fast packet switches are capable of handling different types of communications services in a single integrated communication network including the time-sensitive voice, video and circuit emulation information in constant bit rate (CBR) form and including computer and other non-time-sensitive information in variable bit rate (VBR) form. Although voice and video services can tolerate only a limited amount of delay and delay variance through a communication network, ATM switches are suitable for such services since they minimize delay and delay variance. ATM networks are suitable for concurrently transmitting both CBR time-sensitive and VBR non-time-sensitive information from sources to destinations through an ATM network having many differnt users.

The ATM standard for broadband ISDN networks defines a cell having a length of 53 bytes with a header of 5 bytes and data of 48 bytes. Broadband ISDN defines two transmission bit rate standards of 155M bit/s and 622M bits/s so that the cell clock periods are 2.7 microseconds and 0.68 microseconds, respectively, and the cell clock rates are 0.36M cells/sec and 1.47M cells/sec, respectively.

In a typical ATM switch, the cell processing functions are performed within the nodes of a network. Each node is an ATM switch which includes input controllers (IC's), a switch fabric (SF), output controllers (OC's) and a node control (C). The node control is used for functions including connection establishment and release, bandwidth reservation, congestion control, maintenance and network management.

In each switch, the input controllers are typically synchronized so that all cells from input controllers arrive at the switch fabric at the same time and so that cells can be accepted or rejected according to their priority. The traffic through the switch fabric is slotted and the switch fabric delay equals the sum of the times-lot duration, pipeline delay, and the queueing delay.

The node control communicates with the input controllers and the output controllers either by a direct communication path which by-passes the switch fabric or via control cells transmitted through the switch fabric.

External connections to the switch are generally bidirectional. Bidirectional connections are formed by grouping an input controller (IC) and an output controller (OC) together to form a port controller (PC).

The input sequence of cells in a virtual channel is preserved across the switch fabric so that the output sequence of cells on each virtual channel is the same as the input sequence. Cells contain a virtual channel identifier VCI in the cell header which identifies the connection to which the cell belongs. Each incoming VCI identifier in the header of each cell is translated in an input controller to specify the outgoing VCI identifier. This translation is performed in the input controller typically by table look-up using the incoming VCI identifier to address a connection table. This connection table also contains a routing field to specify the output port of the switch fabric to which the connection is routed. Other information may be included in the connection table on a per connection basis such as the priority, class of service, and traffic type of the connection.

In an ATM switch, cell arrivals are not scheduled. In a typical operation, a number of cells may arrive simultaneously at different input ports each requesting the same output port. Operations in which requests exceed the output capacity of the output port are referred to as output contention (or conflict). Since an output port can only transmit a fixed number (for example, one) cell at a time, only the fixed number of cells can be accepted for transmission so that any other cells routed to that port must either be discarded or must be buffered in a queue.

Different methods are employed for routing cells through a switch module, for example, self-routing and label routing.

A self-routing network operates with an input controller prefixing a routing tag to every cell. Typically, the input controller uses a table lookup from a routing table to obtain the routing tag. The routing tag specifies the output port to which the cell is to be delivered. Each switching element is able to make a fast routing decision by inspecting the routing tag. The self-routing network ensures that each cell will arrive at the required destination regardless of the switch port at which it enters.

A label routing network operates with a label in each cell referencing translation tables in each switching element. The label is translated in each switching element and hence any arbitrary network of switching elements may be employed.

Switches have two principal designs, time-division and space division. In a time-division switch fabric, all cells flow through a single communication channel shared in common by all input and output ports. In a space division switch, a plurality of paths are provided between the input and output ports. These paths operate concurrently so that many cells may be transmitted across the switch fabric at the same time. The total capacity of the switch fabric is thus the product of the bandwidth of each path and the average number of paths that can transmit a cell concurrently.

When the traffic load exceeds the available system resources in a network, congestion is present and performance degrades. When the number of cells is within the carrying capacity of the network, all cells can be delivered so that the number of cells delivered equals the number of cells sent without congestion. However, if cell traffic is increased to the level that nodes cannot handle the traffic, congestion results.

Congestion can be brought about by several factors. If nodes in a network are too slow to perform the various tasks required of them (queueing buffers, updating tables, etc.), queues build up, even though excess line capacity exists. On the other hand, even if nodes are infinitely fast, queues will build up whenever the input traffic rate exceeds the capacity of the output traffic rate for any particular group of outputs.

If a node has no free buffers for queuing cells, the node must discard newly arriving cells. For packet data traffic, when a cell is discarded, the packet from which the discarded cell came will be retransmitted, perhaps many times, further aggravating the congestion.

A difference exists between congestion control and flow control. Congestion control relates to insuring that each part of the network is able to carry the offered traffic. Congestion control is a network-wide consideration involving the behavior and carrying capacity of each part of the network at the time that traffic is offered to each part of the network.

Flow control, in contrast, relates to the point-to-point traffic between a given source and a given destination. Flow control insures that a source does not continually transmit data faster than the destination can receive it. Flow control generally involves direct feedback from the destination to the source to signal the source as to the availability of the destination to receive transmissions from the source.

Packet Congestion Control Algorithms

Congestion control algorithms for packet switches have included preallocating resources, packet discarding, packet restricting, flow control, and input choking.

The preallocating of resources avoids a congestion problem for virtual channels. When a virtual channel is set up, a call request travels through the network making table entries at each node that control the route to be followed by subsequent traffic. With preallocating, each call request reserves one or more data buffers in each node unless all the buffers are already reserved. If all buffers are reserved, another route is found or a "busy signal" is returned to the source. If buffers are reserved for each virtual channel in each node, there is always a place to store any incoming packet to that node. The problem with preallocation is that substantial buffer resources are allocated to specific virtual channel connections, whether or not there is any traffic over the virtual channel. An inefficient use of resources results because resources not being used by the connection to which they are allocated are nevertheless unavailable to other virtual channels.

With packet discarding, if a packet arrives at a node and there is no place to store it, the node discards it. Congestion is resolved by discarding packets at will. A copy of the packet is kept elsewhere and retransmitted later. Discarding packets at will, if carried too far, results in inefficient operation since the retransmission tends to increase traffic in an already congested network.

Packet restricting limits the number of packets at any location in a network to avoid congestion since congestion only occurs when there is an excessive number of packets at a particular location in the network. Packet restricting is performed in one method by issuing permits. Whenever a node requests sending a packet, the node must first obtain a permit. When the destination finally receives the packet, the permit is again made available for reuse. Although the permit method guarantees that the network as a whole will never become congested, it does not guarantee that a given node will not become swamped with packets. Also, the permit distribution mechanism is difficult to implement without suffering long delays.

Flow control has been used in some networks (for example, ARPANET) in an attempt to eliminate isolated congestion. For example, flow control has been used by the transport layer to keep one host from saturating another host and by one node to prevent that node from saturating its neighbor node. However, flow control has not been effective to solve network-wide congestion.

Input choking has been used to control congestion. Whenever congestion is detected, a choke packet is sent back to the source to choke off input packets. To determine congestion, each newly arriving packet at a node is checked to see if its output line is congested. When congestion is detected at a node, the node sends a choke packet back to the source identifying the destination having congestion. When a source receives a choke packet, the source reduces by some factor the traffic sent to the specified destination. Other packets having the same destination that are already under way generate additional choke packets that are ignored by the source for a first time period. After that first time period has expired, the source looks for more choke packets for a second time period. If during the second time period a choke packet arrives indicating that the line is still congested, the source reduces the flow still more and repeats the process. If no choke packets arrive during a subsequent second time period, the source increases the flow again. The feedback in this protocol tends to prevent congestion but does not throttle flow until congestion is detected.

Several variations on the input choking algorithm have been proposed for packet switches. In one variation, the nodes maintain two congestion thresholds. Above the first threshold but below the second, choke packets are sent back. Above the second threshold, incoming traffic is discarded, it being assumed by the second threshold that the host has received notification of the congestion.

Another input choking variation is to use queue lengths instead of line utilization as the trigger signal for congestion. Another choking variation has nodes propagate congestion information along with routing information, so that the congestion trigger is not based on information from only one node, but on information that somewhere along the path there is congestion. By propagating congestion information in the network, choke packets can be sent at an early time, before too many more packets are under way, thus preventing congestion from building up.

The above-identified application entitled METHOD AND APPARATUS FOR REACTIVE CONGESTION CONTROL IN AN ASYNCHRONOUS TRANSFER MODE (ATM) NETWORK discloses a method and apparatus for reactive congestion control in an asynchronous transfer mode (ATM) network where the network is formed by the interconnection of nodes. Each of the nodes includes a forward path for transfer of information from source to destination through the network and a return path for returning explicit congestion control signals. Each source includes a modifiable issue rate unit which issues forward information signals at different rates for virtual channels in response to the presence and absence of congestion signals received on the return path. A variable issue rate unit has an exponential rate for reducing the issue rate in response to receipt of congestion signals. The variable rate source has an exponential increase in the issue rate in the absence of congestion control signals after the issue rate has been reduced.

There is a further need for practical components for use in ATM networks that are capable of processing cells for a plurality of virtual channels.

SUMMARY OF THE INVENTION

The present invention is a method and an apparatus for concurrently processing packets in an asynchronous transfer mode (ATM) network. Packets that are to be transmitted are segmented into a plurality of cells, concurrently for a plurality of channels, and the cells are transmitted over an asynchronous transfer mode (ATM) channel. Cells received from the asysnchronous transfer mode (ATM) channel are reassembled into packets concurrently for the plurality of channels.

The present invention employs pipelined processing units for segmentation and for reassembly that concurrently process cells for packets for the plurality of channels. A pipelined segmentation unit includes a pipelined segmentation processor, control memory, and data memory where the segmentation unit receives the packet inputs for two or more channels and provides ATM cell outputs concurrently for the two or more channels. A pipelined reassembly unit includes a pipelined reassembly processor, control memory, and data memory where the reassembly unit receives the ATM cell inputs for the two or more channels and provides packet outputs concurrently for the two or more channels.

The pipelined segmentation unit includes a control memory storing two-dimensional queues of descriptors. Each descriptor stores information about a single packet for use in segmentation or reassembly. First dimension rate queues are provided for queueing descriptors for packets of different channels having cells to be transmitted at the same peak rate. Second dimension channel queues are provided with one channel queue for each channel having a descriptor in the rate queue. Each channel queue queues descriptors for packets of the same channel. Each channel queue is associated with one channel.

A plurality of rate queues are provided, one for each transmission rate. Each rate queue is a linked list of descriptors, each descriptor in the rate queue identifies a packet from a different one of the channels having cells to be transmitted at the rate for the particular rate queue. The linked list of descriptors for the rate queue identifies a different packet for each of the channels having a cell to be transmitted at the rate for the particular rate queue.

A plurality of channel queues are provided, one for each channel having a descriptor in a rate queue. Each channel queue is a linked list of descriptors, each descriptor identifying a packet to be transmitted, for an associated one of the channels, where the linked list of descriptors for the channel queue identifies all the packets, for the associated one of the channels, to be transmitted.

The present invention employs average rate metering in combination with reactive rate control.

The foregoing and other objects, features and advantages of the invention will be apparent from the following detailed description in conjunction with the drawings.

BRIEF DESCRIPTION OF THE DRAWINGS

FIG. 6 depicts a schematic representation of a typical one of the nodes (N) in the FIG. 3 network.

FIG. 7 depicts further details of one embodiment of the typical node of FIG. 5.

FIG. 8 depicts a schematic block diagram of a plurality of source/destination (S/D) users connected through a wide-area multinode network formed of a plurality of local networks.

FIG. 9 depicts timing diagrams representative of the operation of a source in response to congestion.

FIG. 12 depicts a representation of the two-dimensional rate queues used in the segmentation unit in the source of FIG. 10.

FIG. 15 depicts timing diagrams representative of the operation of a network with the segmentation unit in the source of FIG. 9 and the reassembly unit in the destination of FIG. 11.

FIG. 16 depicts a timing diagram representing the cell clock for the segmentation unit of FIG. 10.

FIG. 17 depicts a timing diagram representing the Data_Request_Transmit (DRT) queue for the segmentation processing unit of FIG. 10.

FIG. 18 depicts a timing diagram representing the TIQ signal from the TI counter.

FIG. 19 depicts a timing diagram representing the Cell_Ctr signal for the segmentation unit of FIG. 10.

FIG. 20 depicts a timing diagram representing the Data_Transmit signal for the segmentation processing unit of FIG. 10.

DESCRIPTION OF THE PREFERRED EMBODIMENTS

Figure 1:
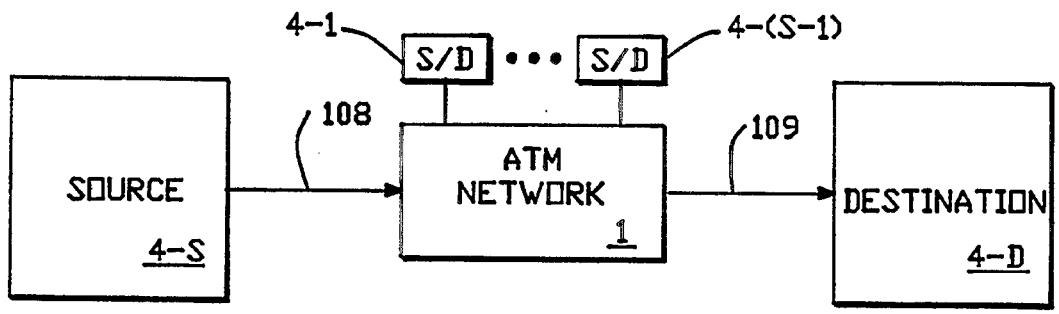
FIG. 1 depicts a block diagram of communication system including a source communication unit connected by an ATM network to a destination communication unit.
Figure 2:
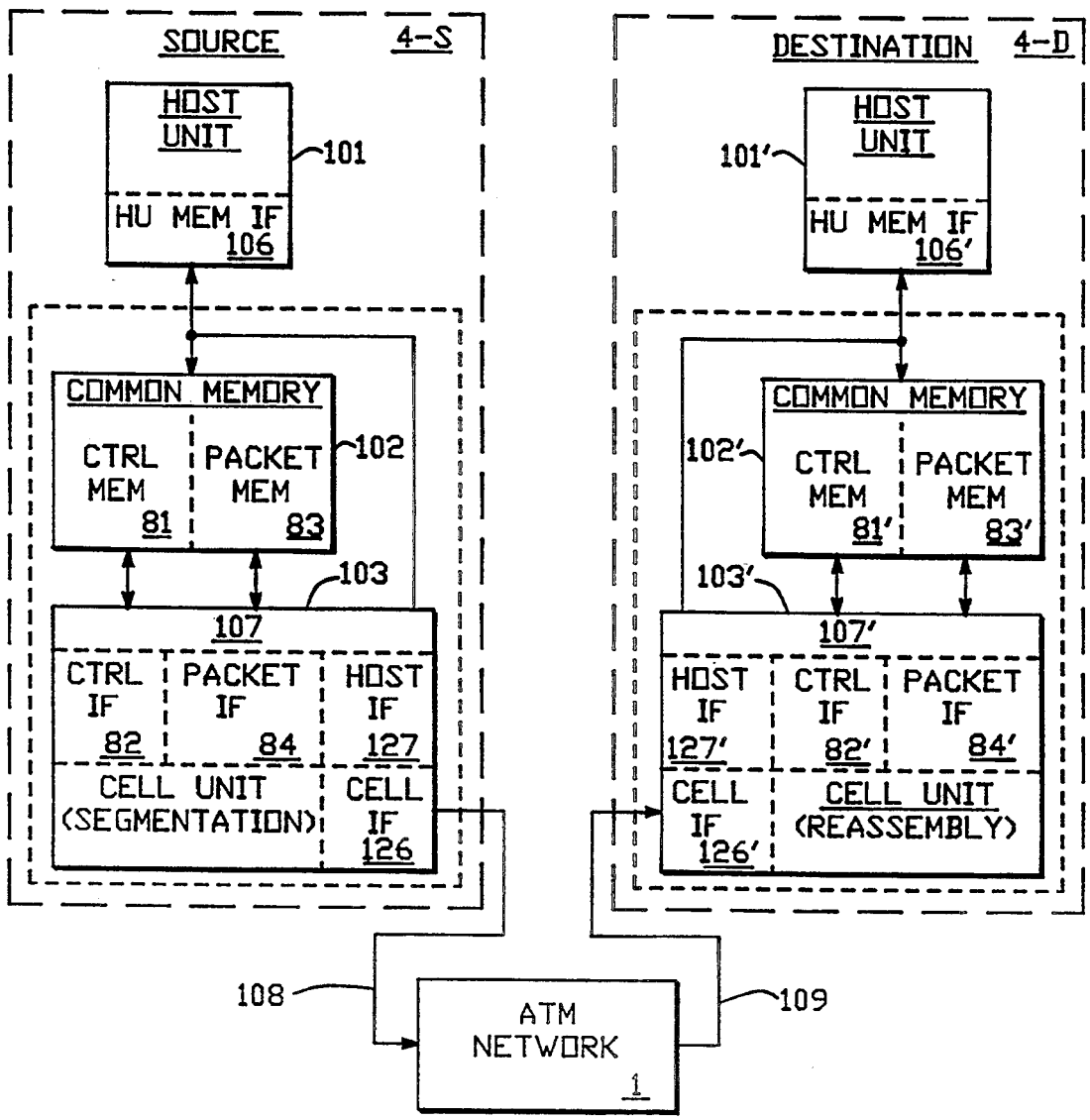
FIG. 2 depicts a block diagram of the FIG. 1 system in which the source includes a segmentation unit and the destination includes a reassembly unit.

Source/Destination ATM System—FIGS. 1 and 2

In FIG. 1, a source communication unit 4-S transmits cells over an asynchronous transfer mode (ATM) network 1 to a destination communication unit 4-D. The geographical area of ATM network 1 can extend between local hosts (backplane connection), can be a local-area network (LAN), a wide-area network (WAN) and, in general, can extend to any size ATM network. In FIG. 1, the source communication unit 4-S and the destination communication unit 4-D are typical of the many sources and destinations that commiunicate through ATM network 1. In FIG. 1, sources and destinations are typically organized in pairs and S such pairs are designated as sources/destinations (S/D) 4-1, . . . , 4-(S-1).

In FIG. 2, further details of the source 4-S and destination 4-D of FIG. 1 are shown that are typical of the sources/destinations (S/D) 4-1, . . . , 4-(S-1) of FIG. 1. In FIG. 2, the source and destination communication units each include a host unit (101 and 101'), a cell unit (103 and 103') and common memory (102 and 102'). In the source 4-S, the cell unit (103) is a segmentation processing unit for segmenting packets for transmission on ATM path 108 over an asysnchronous transfer mode (ATM) network 1 to ATM path 109 to destination 4-D. Packets from the host to be transmitted are segmented into a plurality of cells concurrently for a plurality of channels and the cells are transmitted over the asysnchronous transfer mode (ATM) network 1. Cells received from the asysnchronous transfer mode (ATM) network 1 are reassembled concurrently for the plurality of channels in the destination 4-D by the cell unit 103'. In the destination, the cell unit 103' is a reassembly processing unit that reassembles the packets concurrently for the plurality of channels.

The cell units 103 and 103' are pipelined processing units for segmentation and for reassembly, respectively, of packets.

In FIG. 2, the source 4-S includes a host unit 101, a common memory 102, and a cell unit 103. The common memory 102, in a preferred embodiment, is a dual ported memory having a port for the host unit 101 and having a port for the cell unit 103. The host unit 101 includes a host memory interface 106, for interfacing to one of the ports of memory 102. Similarly cell unit 103 includes a cell unit memory interface 107 for interfacing to the other one of the dual ports of the dual port memory 102. The dual ported memory 102 of the source 4-S of FIG. 1 allows packet information from the host unit 101 to be stored into the common memory 102. The cell unit 103 retrieves the packet information from the common memory 102, segments the packets into cells, and transmits the cells over the ATM path 108 to the ATM network 1 over the ATM path 109 to the destination 4-D.

In FIG. 2, the destination 4-D includes a host unit 101', a common memory 102', and a cell unit 103'. In a preferred embodiment, the common memory 102' is a dual ported memory which connects through one port to the host unit 101' and through the other port to the cell unit 103'. The host unit 101' includes a host memory interface 106' and the cell unit 103' includes a cell unit memory interface 107'. The cell unit 103' receives the cells from the segmented packets on the ATM path 109 and reassembles those cells into packets for a plurality of channels. The cell unit 103' deposits the cells into the common memory 102' where they become available to the host unit 101' as packets for a plurality of channels.

In FIG. 2, the common memory 102 is partitioned into a control memory 81 and a packet memory 83. Similarly, the control memory 102' is partitioned into a control memory 81' and a packet memory 83'. In a preferred embodiment, each of the control memories 81 and 81' is a separate dual ported memory and each of the packet memories 83 and 83' is also a separate dual ported memory.

The cell unit memory interface 107, therefore, includes a cell unit control memory interface 82 which connects the cell unit to the control memory 81 and includes a cell unit packet memory interface 84 which connects the cell unit 103 to the packet memory 83. The cell unit 103 also includes a cell interface 126 which connects the cell unit 103 to the ATM path 108.

In the destination 4-D, the cell unit 103' includes a cell interface 126' for receiving over the ATM path 109 cell data from the source 4-S. The cell unit 103' includes a cell unit control memory interface 82' which connects cell unit 103' to the control memory 81' in the common memory 102'. Also, the cell unit 103' includes a cell unit packet memory interface 84' for connecting the cell unit 103' to the packet memory 83' of the common memory 102'.

In FIG. 2, each of the cell processing units 103 and 103' includes four interfaces. Namely, processing unit 103 includes the host interface 127, control memory interface 82, the packet memory interface 84, and the cell interface 126. Similarly, the control unit 103' includes the four interfaces, namely the host interface 127', the control memory interface 82', the packet memory interface 84', and the cell interface 126'.

In accordance with one preferred embodiment of the present invention, each of the cell units 103 and 103' is a pipelined processing unit which operates to present information concurrently at each of the four interfaces (host interfaces 127 and 127', control memory interfaces 82 and 82', packet memory interfaces 84 and 84', cell interfaces 126 and 126').

In addition to the segmentation and reassembly processing of the FIG. 2 cell units, the source 4-S typically includes variable issue rate means which varies the rate at which cells are issued to the ATM network 1.

In one preferred embodiment, the issue rate is controlled within the source 4-S in accordance with reactive congestion signals received from the ATM network 1 as described in connection with the above-identified application METHOD AND APPARATUS FOR REACTIVE CONGESTION CONTROL IN AN ASYNCHRONOUS TRANSFER MODE (ATM) NETWORK.

Figure 3:
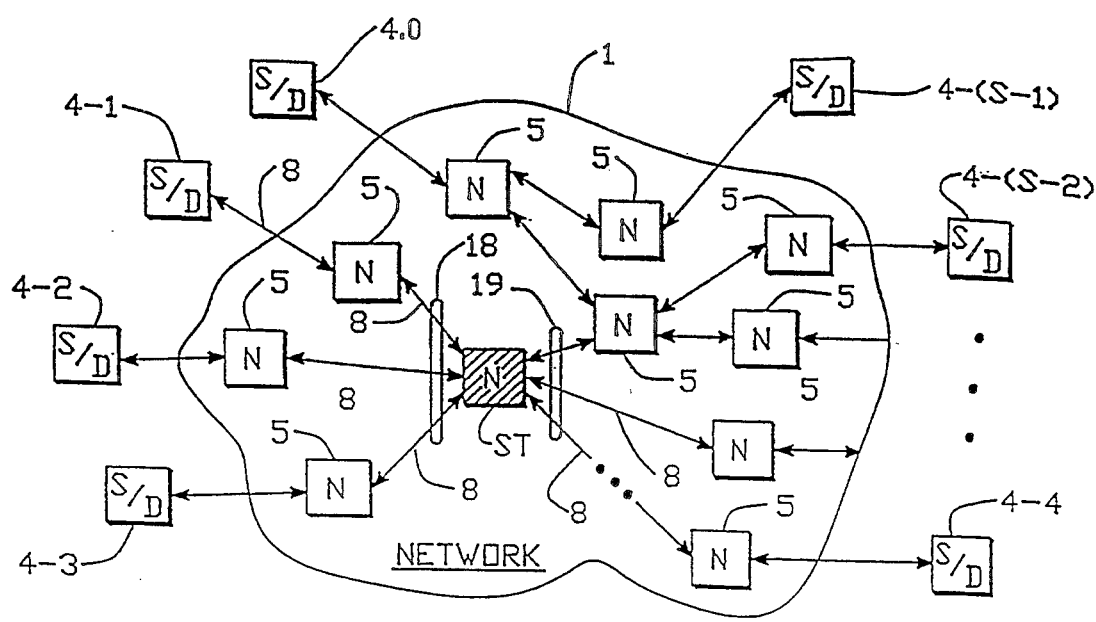
FIG. 3 depicts a schematic block diagram of a plurality of source/destination (S/D) users connected through a multinode ATM network.

Overall Network—FIG. 3

In FIG. 3, a plurality of network users are represented as the source/destination (S/D) 4. Each user typically sends information as a source (S) and receives information as a destination (D). The source (S) of an S/D unit 4 will send information to the destination (D) of some other S/D unit 4. In order for information to be transferred from a source to a destination, each S/D unit 4 connects through a multinode (N) network 1. The network 1 includes many nodes (N) 5. The nodes are connected from node to node so that, in general, any particular one of the S/D units 4 can connect to any one of the other S/D units 4 by forming a virtual channel connection across a chain of nodes 5 in the network 1. In general, the links between the S/D units 4 and a node 5, and the links between nodes 5, are by bi-directional links 8 which enable information to be transferred in both directions.

In FIG. 3, the number of nodes (N) 5 shown is for clarity a relatively small number, but the network may include hundreds more nodes. Also, the S/D units 4 include the S users 4-0, 4-1, 4-2, 4-3, 4-4, ..., 4-(S-2), 4-(S-1). The value of S can be any integer where S is typically equal to hundreds or higher.

In a typical embodiment, the FIG. 3 communication system is an ATM network in which the unit of transfer of information is a cell. A plurality of cells form packets of information. The network 1 communicates cells and packets so as to support different types of information including images, voice and data.

Figure 4:
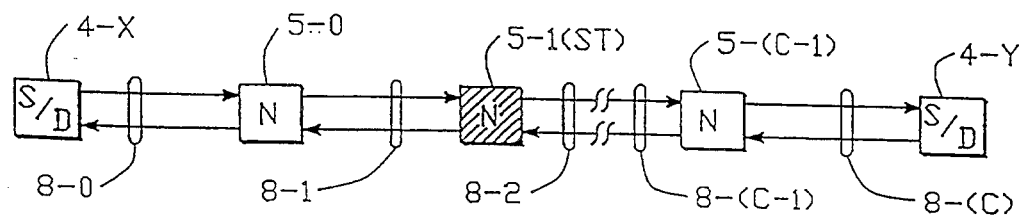
FIG. 4 depicts a schematic representation of a circuit with one S/D user connected to another S/D user through a sequence of nodes in the network of FIG. 3.

Virtual Channel—FIG. 4

In FIG. 4, the S/D unit 4-x connects through a plurality C of nodes (N) 5-0, 5-1, ..., 5-(C-1) to the S/D unit 4-y.

In FIG. 4, the S/D unit 4-x is typical of any of the S/D units 4 of FIG. 3. For example, the S/D unit 4-x may represent the S/D unit 4-2 in FIG. 3. Similarly, the S/D unit 4-y in FIG. 4 may represent any of the S/D units 4 in FIG. 3. For example, S/D unit 4-y may represent the S/D unit 4-4 in FIG. 4. In such an example, the nodes 5-0, 5-1, ..., 5-(C-1) represent the C nodes in the network 1 of FIG. 3 which are used to connect the S/D unit 4-2 to the S/D unit 4-4.

In FIG. 4, the bi-directional links 8-0, 8-1, ..., 8-(C-1), 8-(C) connect from the S/D unit 4-x through the nodes 5-0, 5-1, ..., 5-(C-1) to the S/D unit 4-y.

In FIG. 4, information may be transferred from the source (S) in the S/D unit 4-x to the destination (D) in the S/D unit 4-y. Similarly, information from the source (S) in the S/D unit 4-y can be transferred to the destination (D) in the S/D unit 4-x. While information may be transferred in either direction in FIG. 4, it is convenient, for purposes of explanation to consider transfers between a source (S) and a destination (D) whether that be from the S/D unit 4-x to the S/D unit 4-y or from the S/D unit 4-y to the S/D unit 4-x. Regardless of the direction, each transfer is from a source (S) to a destination (D).

Figure 5:
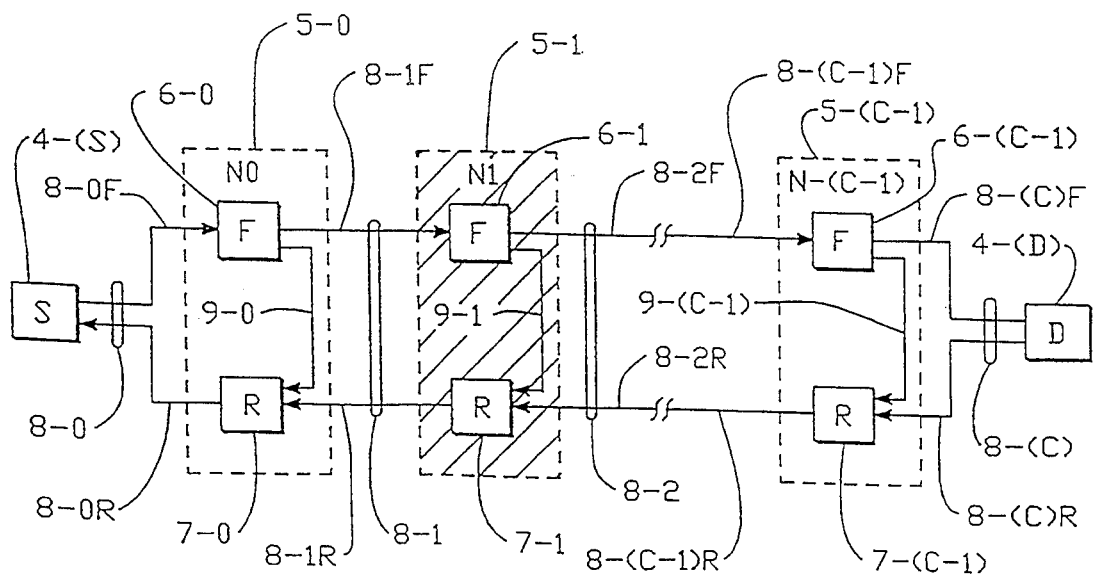
FIG. 5 depicts a schematic representation of the FIG. 4 circuit with a virtual channel connection of the source (S) sending information in a forward direction (F) to a destination (D) and with a reverse direction (R) for transmitting control signals to the source (S).

S to D Transfers—FIG. 5

In FIG. 5, a schematic representation for a source (S) to destination (D) transfer in the virtual channel of FIG. 4 is shown. In FIG. 5, the source unit 4-(S) in the S/D unit 4-x of FIG. 4 connects to the destination unit 4-(D) in the S/D unit 4-y of FIG. 4.

In FIG. 5, each of the links 8-0, 8-1, ..., 8-(C-1), 8-(C) includes a forward (F) channel for transferring information in the forward direction and a reverse (R) channel for transferring information in the reverse direction. The reverse channel in FIG. 5 is associated with the transfer of information from the source unit 4-(S) to the destination unit 4-(D). The reverse channel in FIG. 5 is for the purpose of sending control information used in connection with congestion control within the network of FIG. 4. The reverse channel (R) is distinguished from the forward channel (F) used for the transfer of information in the forward direction from S/D unit 4-y to S/D unit 4-x, as discussed in connection with FIG. 4. Both the forward (F) and the reverse (R) channels are associated with the source unit 4-(S) transfer to the destination unit 4-(D). Each of the nodes in FIG. 5 includes forward (F) circuitry 6 and reverse (R) circuitry 7. In FIG. 5, the forward channels 8-0F, 8-1F, . . . , 8-(C-1)F connect as inputs respectively to the forward circuits 6-0, 6-1, . . . , 6-(C-1). The forward channel 8-(C)F connects from the forward circuit 6-(C-1) to the D unit 4-(D). Similarly, the reverse channels 8-0R, 8-1R, . . . , 8-(C-1)R connect from the reverse circuits 7-0, 7-1, . . . , 7-(C-1). The reverse channel 8-(C)R connects from the D unit 4-(D) to the reverse circuit 7-(C-1).

In FIG. 5, each of the nodes 5 has a feedback connection 9 connecting from the forward (F) circuit 6 to the reverse (R) circuit 7. Specifically, the feedback channels 9-0, 9-1, . . . , 9-(C-1) connect from the forward (F) circuits 6 to the reverse (R) circuits 7 in the nodes 5-0, 5-1, . . . , 5-(C-1), respectively. In the FIG. 5 circuit, a virtual channel connection is made along the forward channel setting up a communication path in the forward direction between the S unit 4-(S) and the D unit 4-(D). Because other virtual channels are also established in the network 1 of FIG. 3, congestion may arise at any node or destination including the nodes of FIG. 5. The feedback channels 9 are utilized to send back an explicit congestion signal using the reverse (R) channels 8-0R, 8-1R, . . . 8-(C1)R, 8-(C)R and reverse circuits 7. When the source (S) unit 4-(S) receives an explicit congestion signal on the reverse channel 8-0R, source unit 4-(S) takes corrective action to reduce the congestion in the network. Specifically, in accordance with the present invention, source unit 4-(S) reduces the rate at which data is inserted over the forward channel through channel 8-0F from the assigned rate (Maximum Channel Peak Cell Rate) to some lower rate (Current Channel Peak Cell Rate). After a time period such that congestion is likely to have cleared, the source unit restores the insertion rate of information in the forward channel over the link 8-0F to its original maximum rate.

Since the FIG. 5 virtual channel is typical of all of the virtual channels established in the network of FIG. 3, the combined operation of all the virtual channels in an ATM system is to dynamically control the insertion rate of input information, and specifically to reduce the insertion rate in the presence of congestion in the network and to restore the insertion rate in the absence of congestion in the network.

Each virtual channel, like the FIG. 4 virtual channel, functions with a feedback control for controlling the insertion rate of information into the network. In order for the feedback control in FIG. 5 to have a good response time, the delay in time from the detection of congestion until the source unit takes corrective action should be small. In general, the feedback delay value has two basic components. The first component of delay is the circuit path delay for each node to node transfer required from the point of congestion back to the source. The second component of the delay is the signal processing time required in each node including generation of the congestion signal in each reverse circuit 7 in each node in order to transmit the explicit congestion signal through the node. The total feedback delay is, therefore, the sum of the node-to-node reverse signal transfer times and the sum of the reverse signal processing times. For any given system, the reverse signal transfer time from node to node is not readily changed and is substantially fixed for any particular system. The present invention causes the reverse signal processing time to be much less than the reverse signal transfer time. Therefore, substantially all of the feedback delay is a result of the reverse signal transfer time and the feedback processing time is small or negligible.

Single Node Embodiment—FIG. 6

In FIG. 6, one typical embodiment of a node having the feedback control reverse signal paths of FIG. 5 is shown. In FIG. 6, the node 5 includes N links 18-0, 18-1, . . . , 18-n . . . , 18-(N-I). Each of the links 18 of FIG. 6 are analogous to the bi-directional links 8 of FIG. 4.

In FIG. 6, the links 18-0, 18-1, . . . , 18-n, . . . , 18-(N-I) connect to port controllers 11-0, 11-1, . . . , 11-n . . . , 11-(N-1). The node of FIG. 6 is used in connection with the information transfer of FIG. 4, for example, by having one of the links 18, for example, input link 18-0 in FIG. 6, connect through switch fabric 10 to another one of the links 18, for example, link 18-n. In the example described, the switch fabric 10 functions to connect the link 18-0 to the link 18-n.

In an example where the node of FIG. 6 represents the node 5-1 in FIG. 4, the link 8-1 in FIG. 4 is the link 18-0 in FIG. 6 and the link 8-2 in FIG. 4 is the link 18-n in FIG. 6.

With such a connection, the node of FIG. 6 connects information in one direction, for example, from link 18-0 to link 18-n, and connects information in the opposite direction from the link 18-n to the link 18-0. The links 18-0 and 18-n were arbitrarily selected for purposes of explanation. Any of the N links 18 might have been selected in the FIG. 4 circuit for connection to any of the other links 18.

When the node of FIG. 6 is used in the virtual channel connection of FIG. 4 with the source (S) on the left and the destination (D) on the right, then for purposes of explanation it is assumed that the link 18-0 is an input to the node 5 in the forward direction and the link 18-n is output from the node in the forward direction.

In FIG. 6, port controllers (PC) 11-0, 11-1, . . . , 11-n, . . . , 11-(N-1) have input controllers 14-0, 14-1, . . . , 14-n, . . . , 14-(N-1), respectively and have output controllers (OC) 15-0, 15-1, . . . , 15-n, . . . , 15-(N-1), respectively. In FIG. 6, forward information cells from the source 4-(S) of FIG. 5 sent to the destination 4-(D) of FIG. 5 connect from the bus 18-0I through the input controller 14-0 to the bus 20-0I through the switch fabric 10 to the bus 20-nI through the output controller 15-n to the bus 18-nO. If congestion is detected at the node 5, then an explicit congestion signal is connected, for example, from the output controller 15-n to the input controller 14-n to the bus 20-nI back through the switch fabric 10 to the bus 20-0O to the output controller 15-0 to the output bus 18-0O.

NODE—FIG. 7

In FIG. 7, a more detailed embodiment of the node of FIG. 6 is shown. In FIG. 7, the port controller 11-0 is shown typical of all of the port controllers 11 of FIG. 6. Similarly, the port controller 11-n is typical of all of the port controllers 11 of FIG. 6. In FIG. 7, the port controller 11-n is identical to the port controller 11-0 except that the images in port controller 11-n are flipped about 180° in order to provide symmetry in the drawing. As indicated in connection with FIG. 6, in the virtual channel of FIG. 4, the controller 11-0 of FIG. 7 serves as an input for forward going cells while the controller 11-n functions as an output for forward going cells.

In FIG. 7, the port controllers 11-0 and 11-n include input controllers (IC) 14-0 and 14-n each having a selector 50, a translator 51 and a reverse signal queue 52. The port controllers 11-0 and 11-n also include an output controller (OC) 15-0 and 15-n each having a selector (SEL) 53, a queue (Q) 54 and a reverse marker (RM) 49.

The operation of the FIG. 7 node in connection with the virtual channel of FIG. 4 is as follows. Forward transmitted cells appear on the bus 18-0I input to the selector 50 of the input controller 14-0. Selector 50 normally is set to select the input bus 18-0I unless the reverse queue 52 has congestion control information which must be returned in connection with the operation of some other virtual channel. If the not empty (N-EMT) signal is asserted indicating that congestion information is stored in the queue 52, selector 50 selects the output from queue 52 but otherwise selects the forward cells on bus 18-0I.

The translator 51 for each cell translates the value of the incoming virtual channel identifier (VCI) for the cell to an outgoing VCI for the cell, directs the cell to an outgoing link, and marks the priority of the cell. For example, the translator is implemented as a table storing values where the table is addressed by the incoming VCI.

The cell information together with the translated VCI appear on the bus 20-nO to the selector 53 in the output controller 15-n. Selector 53 normally selects the bus 20-nO for connection to the queue 54. If queue 54 is filled beyond a threshold as indicated by the Q1 signal selector 53 copies the VCI and control information to the queue 52 through the reverse marker unit 49. Reverse marker unit 49 marks the VCI label with a reverse signal indication so that reverse signals can be distinguished from forward signals.

The threshold signal Q1 indicating the fullness of queue 54 is a congestion signal that is transmitted back to the source 4-(S) of FIG. 5. If queue 52 has any information stored, it issues the N-EMT signal indicating a not empty condition to the selector 50 in the input controller 14-n. Selector 50 connects its output to the translator 51. Translator 51 translates the return signal VCI back to the original value (which appeared on the input bus 18-0I) so that switch fabric 10 receives the return path congestion signal on the bus 20-0O input to the selector 53. Selector 53, assuming that the queue 54 is not full, connects the return signal to the queue 54 for output on the return bus 18-0O. Accordingly, the translator 51 in the input controller 14-n reverses the translation done in the translator 51 in the input controller 14-0.

Wide-Area Network Formed By Plural Local Networks—FIG. 8

In FIG. 8, a wide-area communication system employing networks of the FIG. 3 type is shown. The FIG. 8 system is comprised of a group of generally local communication systems including the networks 1-0, 1-1, ..., 1-(L-I). Each of the local networks of FIG. 7 includes source and destination units of the type previously described in connection with the FIG. 3 network. Specifically, local communication systems are formed by the local network 1-0 together with the local source/destination (S/D) units 4(0,0), ..., 4(0,$S_0$-1), the local network 1-1 together with the local the S/D units 4(1,0), ..., 4(1,$S_1$-1), and the local network 1-2 together with the local S/D units 4(2,0), ..., 4(2,$S_2$-1) and the local network 1-(L-l) together with the local the S/D units 4(L-1,0), ..., 4(L-1, $S_{L-1}$-1).

In FIG. 8, the wide-area system includes a wide-area source 4-0 connected to local network 1-0 and a wide-area destination 4'-(L-1) connected to local network i-(L-1).

In FIG. 8, the local networks 1 are connected together by links 8 and specifically link 8(0,1) connects local networks 1-0 and 1-1, link 8(1,2) connects local networks 1-1 and 1-2 and so on such that local network 1-(L-1) is connected through links and local networks to local network 1-0. In this manner, wide-area source 4-0 is connected to wide-area destination 4'-(L-i). The wide-area S/D units 4-0 and 4'-(L-1) are typical of many such units which, for clarity, are not shown in FIG. 8.

In FIG. 8, the links 8(0,1), 8(1,2), 8(2,—), ..., 8(—,L-1) between local networks are the same as the links 8 between local S/D units except that they are typically longer in length.

In FIG. 8, a plurality of virtual channels are established between wide-area S/D units and local S/D units. Accordingly, a virtual channel is established, for example, between S/D unit 4-0 and S/D unit 4'-(L-1).

The operation of the FIG. 8 network is described in connection with FIG. 9 in which it is assumed that the cell transmission interval (CTI) is short. This short cell transition interval is evident since the transmitted cell at $XR_1$3 results in a congestion signal, Cong—signal 1 at a time $XR_1$3+, only a short time after the cell is transmitted. Accordingly, the forward transmission of the cell at $XR_1$3 originated (with reference to FIG. 5) at the source 4-(S) and is transmitted into the network along the virtual channel (FIG. 4) possibly as far as the node 5-(C-1) or the destination 4(D). When congestion is encountered, a return cell is transmitted along the return path 8-R (FIG. 5) so as to arrive back at the source 4-(S) in a fraction of a Channel Cell Interval (CCI). In FIG. 9, for virtual channel 1, the CCI interval is the interval between each $Xmit\_Rate_1$ time, for example, between $XR_1$0 and $XR_1$1. Accordingly, the reactive control operation in reducing the transmission rate in the FIG. 9 example is very fast.

In FIG. 9, the return transmission interval for a congestion signal returning from a congested node to the source is short and in particular is less than a single CCI as measured from the time that the original cell is transmitted from the source in the forward direction. The return transmission interval, therefore, includes both the forward path delay (from the source to the node having congestion) and the return path delay (from the node having congestion back to the source). Also included within the return transmission interval is the delay resulting from the return cell processing time required for converting forward cells to return cells and processing the return cells.

While the FIG. 9 example has a return transmission interval of less than one CCI, return transmission intervals of less than approximately 10 CCI are still considered short so that the issue rate unit can reactively modify the transmission rate and thereby reduce congestion.

In order to keep the return transmission interval short, the return cell processing time must also be kept short and is desireable much less than the return transmission interval.

In the FIG. 8 system, it is contemplated that the distance between the local network 1-0, for example, and the local network 1-(L-1) may be very far so that the delay time that may be encountered by a source 4-0 associated with network 1-0 in cell transmissions to a destination, for example, 4'-(L-1) associated with a network 1-(L-1) may be much longer than a Channel Cell Interval. The longer the transmission time from a source to a destination and the return time from the destination back to the source, the less effective becomes the reactive control mechanism. If all communications in a very long network are from the source at one end of the network to a destination at the far end of the network, then the effectiveness of reactive control for very long distance networks is reduced. However, experience indicates that a large percentage (for example, 80%) of data traffic in a large network tends to be local and not the full long distance of the network. For example, if the traffic for the network 1-0 between the S/D units 4(0,0), . . . , 4(0,$S_0$-1) is principally local, then the reactive control mechanism is effective for controlling the congestion by controlling the transmission issue rate of the local sources for the network 1-0. Similarly, for each of the other local networks such as networks 1-1 and 1-2 of FIG. 8, the local traffic in each of those networks is controlled by controlling the issue rate and the sources for local traffic in those networks. Since the entire network of FIG. 8 is composed of groups of local networks and each local network is effective to control congestion by controlling the local traffic issue rates, congestion is effectively controlled for the entire network of FIG. 8. The issue rates in sources are controlled by variable rate units in each source. In FIG. 8, each source (like source 4-S in FIG. 2) in the S/D units 4 typically includes a variable rate unit. A typical variable rate unit (VRU) is described in greater detail in the above-identified application entitled METHOD AND APPARATUS FOR REACTIVE CONGESTION CONTROL IN AN ASYNCHRONOUS TRANSFER MODE (ATM) NETWORK. In the present specification, the variable rate unit is included within the segmentation unit 103 of FIG. 2 which is described hereinafter in further detail in connection with FIG. 10.

Figure 10:
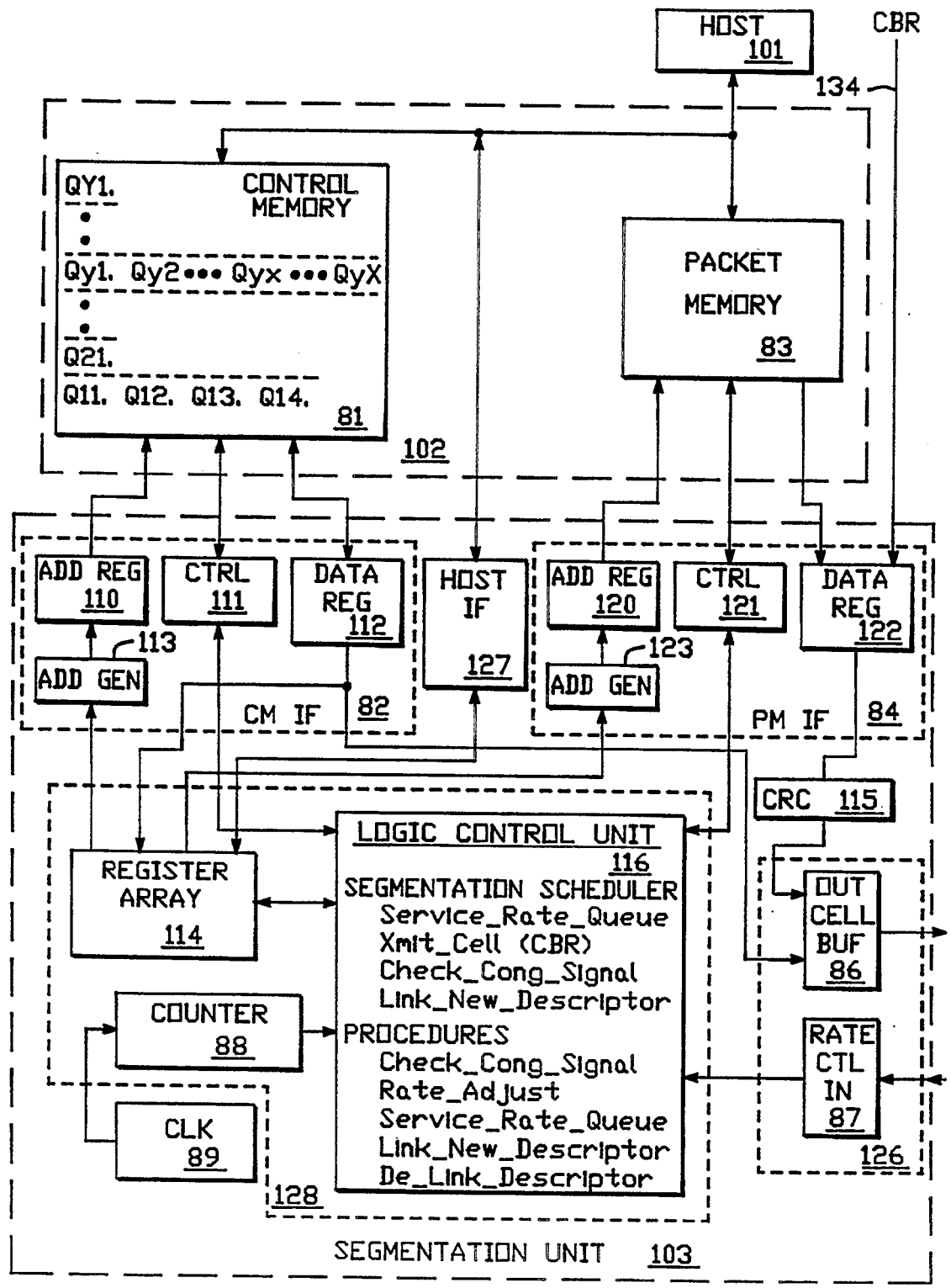
FIG. 10 depicts a schematic block diagram of the source of FIG. 1.
Figure 11:
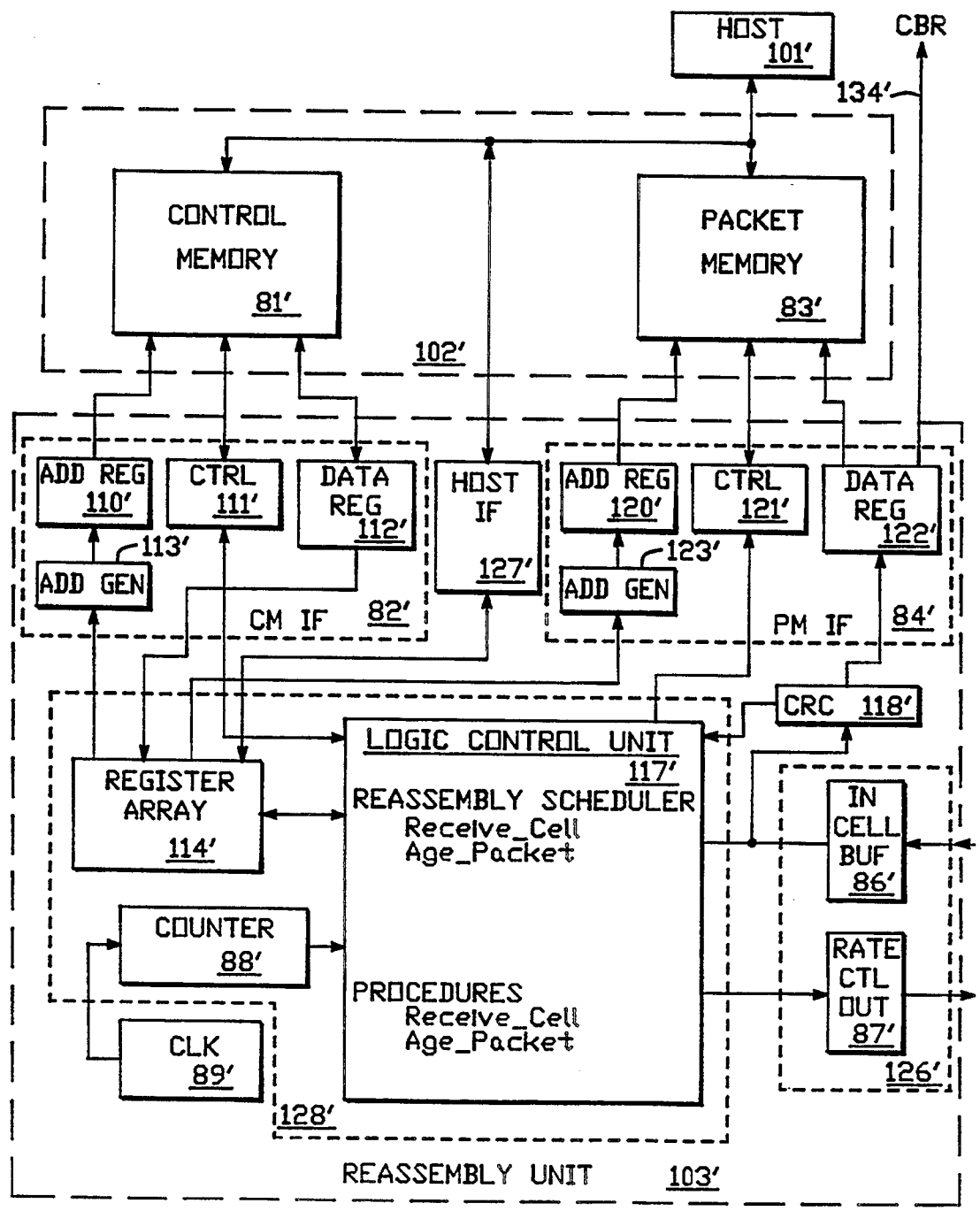
FIG. 11 depicts a schematic block diagram of the destination of FIG. 1.

When congestion is present in the network of FIG. 8, a congestion signal (for example, on reverse path 8-0R of FIG. 5 for a typical virtual channel) is received in a return cell by a reassembly unit (like reassembly unit 103' in FIG. 2 and FIG. 11). The return cell has a return indicator for indicating congestion on the virtual channel. The reassembly unit detects the congestion and indicates the presence of that congestion in a return cell. The return cell causes a rate control signal to be output to rate control output 87' in a reassembly unit (see FIG. 11). The rate control output 87' inturn causes a rate control input to rate control input unit 87 of a corresponding segmentation unit (see FIG. 10). The rate control input (unit 87 in FIG. 10) provides the rate control input signal to a control unit in the segmentation unit control unit 116 in FIG. 10). The rate control signal includes a pointer for pointing to a virtual channel identifier, Cong—Signal—VCI, which identifies the virtual channel which has experienced congestion.

The variable rate unit as part of the segmentation unit 103 of FIG. 2 includes a packet memory 83 and a direct memory access (DMA) control 84. During normal operation, the DMA control 84 obtains cells from the packets in packet memory 83 and outputs those cells to the cell buffer 86 for transmission in the forward direction on the forward link from buffer 86 (the forward link corresponds to link 8-0F in FIG. 5). The output rate on the forward link is the rate from the from the DMA controller 84 and that rate will normally be at the maximum cell rate for each virtual channel in the absence of a return cell indicating congestion received back on the return link (the return link corresponds to the link 8-0R in FIG. 5).

The variable rate unit also utilizes the control memory 81 and a control memory interface 82 of FIG. 2. Control memory 81 stores control information about each virtual channel that is established to send information from packet memory 83 to the output channel (for example, link 8-0F in FIG. 5). The control information stored for each channel includes a congestion level value, Cong—Level, indicating the level of the reduced rate of transmission due to congestion on the virtual channel. The control information stored for each channel includes a recovery rate value, RC—Mode, indicating the rate of recovery of transmission rate after the rate has been reduced due to congestion on the virtual channel. The control information stored for each channel includes a counter field, Recovery—Count, for counting cells during congestion periods and a control field, RC—Inhibit, for controlling changes In rate during congestion periods.

Upon receipt of a congestion signal, the control rate for the virtual channel is modified along with the transmission rate used for that particular channel. After the congestion signals no longer exist for a particular virtual channel, the rate of transmitting the information for the virtual channel which was previously experiencing congestion is modified.

The apparatus for and the methods of operation of source units having packet memories and DMA controllers are described in greater detail in the above-identified application entitled METHOD AND APPARATUS FOR REACTIVE CONGESTION CONTROL IN AN ASYNCHRONOUS TRANSFER MODE (ATM) NETWORK. The operation of such sources is explained with reference to a number of terms.

Terms For Automatic Rate Control Algorithm

"Virt—Chan" identifies one of a number of virtual channels, where each virtual channel transmits ATM cells at a selected one of a number of Xmit—Rate rates unless, in response to an explicit congestion signal for that virtual channel, the transmission rate is modified by a congestion rate modification value, Cong—Level.

"Rate—Queue" is a list of virtual channel identifiers that identify virtual channels that are to be transmitted at a particular rate.

"Xmit—Rate" defines a number of transmission rates where each Xmit—Rate is the rate to transmit cells used by all of the virtual channels in a Rate—Queue.

"Xcount" defines a number of 4-bit counts, one for each Rate—Queue, where each Xcount for the corresponding Rate—Queue is incremented to count the number of cell transmission opportunities at the full Xmit—Rate rate for that corresponding Rate—Queue.

"Xmit—Time" defines a number of state bits, one fox each Rate—Queue, where each Xmit—Time state bit indicates when it is time to service the corresponding Rate—Queue. Each Xmit—Time state bit is set to the active state each time the Xcount is incremented for the corresponding Rate—Queue.

"Cong—Level" defines a number of 3-bit congestion level values, one for each virtual channel, where each value for the corresponding virtual channel is used to reduce the transmission rate of that corresponding virtual channel below the normal non-reduced Rate_Queue rate.

"RC_Mode" defines a number of 3-bit exponents, one for each virtual channel, where each exponent for the corresponding virtual channel is used to control the rate of restoring the transmission rate of that corresponding virtual channel back to the normal Rate_Queue rate after the transmission rate of that virtual channel has been reduced because of congestion. The rate of restoring is determined by a Recovery_Value=$2^{RC\_Mode}$.

"RC—Inhibit" defines a number of state bits, one for each virtual channel, where each RC—Inhibit state bit for the corresponding virtual channel is used to inhibit changes in Cong—Level during a period existing after a change in Cong—Level for that corresponding virtual channel and before a cell has been transmitted over that corresponding virtual channel.

"Recovery_Count" defines a number of 4-bit count values, one for each virtual channel, where each Recovery_Count value for the corresponding virtual channel is used for counting transmitted cells for that corresponding virtual channel as measured from the time that the last Cong_Signal was detected for that virtual channel. Recovery_Count is compared with Recovery_Value for the corresponding virtual channel to control restoring the transmission rate of cells for that corresponding virtual channel. When Recovery_Count equals Recovery_Value for the corresponding virtual channel, Cong_Level is decremented to thereby increase the transmission rate for the corresponding virtual channel.

"Cong_Signal" indicates the presence of one or more Cong_Signal_VCI identifiers stored in a queue for processing where the presence of Cong_Signal is used to trigger the decrementing of the transmission rate of cells for the virtual channels identified by the Cong_Signal_VCI identifiers in the queue.

"Cong_Signal_VCI" are virtual channel identifiers, one for each virtual channel on which a cell has been returned to indicate congestion.

"Pkt_Loss_Signal" indicates the presence of one or more Pkt_Loss_VCI identifiers stored in a queue for processing where the presence of Pkt_Loss_Signal is used to trigger the decrementing of the transmission rate of cells for the virtual channels identified by the Pkt_Loss_VCI identifiers in the queue.

"Pkt_Loss_VCI" are virtual channel identifiers, one for each virtual channel on which the loss of cells has occurred and has been interpreted as an indication of congestion.

The variable rate unit within each source like source 4-S of FIG. 2 (explained in greater detail hereinafter in connection with FIG. 10) uses a counter which is clocked to provide timing. The clock signals establish different transmission rates, Xmit_Rate, one for each Rate_Queue, for transmitting cells over the virtual channels in that Rate_Queue. A number of different rates can be established and in one embodiment, Q rates Xmit_Rate$_0$, Xmit_Rate$_1$, . . . , Xmit_Rate$_{Q-1}$ are established from counter 88. Each one of the Q Xmit_Rates is associated with a 4-bit Xcount which is incremented as a counter by the corresponding Xmit_Rate. Accordingly, the Xcount$_0$, Xcount$_1$, . . . , Xcount$_{Q-1}$ counts are incremented by Xmit_Rate$_0$, Xmit_Rate$_1$, . . . , Xmit_Rate$_{Q-1}$ rates, respectively.

Each of the Q Xmit_Rates is associated with a corresponding queue, Rate_Queue, for storing virtual channel identifiers that identify virtual channels that have cells to be transmitted at the Xmit_Rate of the corresponding Rate_Queue. Accordingly, for uncontested normal operation, the virtual channels having identifiers stored in the Rate_Queue$_0$, Rate_Queue$_1$, . . . , Rate_Queue$_{Q-1}$ queues are serviced for transmitting cells over virtual channels at the Xmit_Rate$_0$, Xmit_Rate$_1$, . . . , Xmit_Rate$_{Q-1}$ rates, respectively.

Each of the Q Xmit_Rates and the corresponding Q Rate_Queues is associated with a state bit, Xmit_Time, for indicating when it is time to service the Rate_Queue. Accordingly, for uncontested normal operation, the Rate_Queue$_0$, Rate_Queue$_1$, . . . , Rate_Queue$_{Q-1}$ queues are serviced whenever the corresponding Xmit_Time$_0$, Xmit_Time$_1$, . . . , Xmit_Time$_{Q-1}$ state bits are set, respectively. Each Xmit_Time state bit is set to the active state each time the Xcount is incremented for the corresponding Rate_Queue.

The variable rate unit is constructed with conventional logic circuits which implement an automatic rate control algorithm. Although the logical functions can also be performed by programed processors, such programmed processors are generally too slow for high speed operations required for ATM systems. The logic for the variable rate unit is included within the following TABLE 1-1 and TABLE 1-2.

TABLE 1-1 defines the parameter values for the automatic rate control algorithm. TABLE 1-2 defines the automatic rate control algorithm using pseudo code.

The operation of the variable rate unit is further described in connection with FIG. 9. The times when Xmit_Time$_1$ are active for Xmit_Rate$_1$ are shown in FIG. 9 as times XR$_1$0, XR$_1$1, XR$_1$2, XR$_1$3, and so on. For purposes of explanation, it was assumed that after transmitting cells by virtual channel 1 with Xmit_Cell$_1$ at XR$_1$0, XR$_1$1, XR$_1$2, and XR$_1$3, an explicit congestion signal Cong_Signal$_1$ was returned at XR$_1$3+ so that no cell was transmitted at XR$_1$4 due to a decrease in the transmission rate. The operation continues thereafter in FIG. 9 both to further decrease the transmission rate and to thereafter recover the rate when congestion stops after XR$_1$9+.

FIG. 9 also depicts another virtual channel transmitting at another rate, Xmit_Rate$_2$, which is at one half the rate of Xmit_Rate$_1$. One congestion signal, Cong_Signal$_2$ is received at XR$_1$1+ causing the cell transmission of Xmit_Cell$_2$ to be at one half the Xmit_Rate$_2$ rate. For clarity, recovery has been assumed to be disabled (RC_Mode=101—Disable_Recovery) for this virtual channel.

In FIG. 9, the ATM Out line represents the sum of the Xmit_Cell$_1$ and the Xmit_Cell$_2$ lines and is the output from the variable rate generator.

It will be apparent from FIG. 9 that the variable rate unit decreases the issue rate (for example, Xmit_Cell$_1$ rate) exponentially in response to a congestion signal. The PROCEDURE Rate Adjust is a means for decreasing the issue rate exponentially. Similarly, the Xmit Rate Recovery Routine is a means for increasing the issue rate exponentially in response to the absence of a congestion signal. The rate of increasing the transmission rate, after it has been decreased in response to congestion, is less than the original rate used to decrease the transmission rate in response to congestion. Making the increasing and decreasing rates different tends to avoid oscillation in the transmission rate and improve the reactive control.

The overall operation of an ATM network, using variable rate sources of the type described, is characterized using the following terms.

"Bit" is a binary unit of information.

"Byte" is a fixed number of bits, typically 8 bits.

"Packet" is a communication message formed of bytes, typically of variable length from 40 to 10,000 bytes.

"Cell" is a fixed length communication message formed of bytes, typically 53 bytes (5 byte header/48 byte data).

"Bit Rate" (BiR) is rate at which a communication system transmits bits.

"Byte Rate" (ByR) is rate at which a communication system transmits bytes.

"Cell rate" (CR) is rate at which a communication system transmits cells.

"Cell Interval" (CI) is period from one cell to the next cell.

"Channel Cell Interval" (CCI) is the cell interval for a virtual channel transmitting at the Channel Peak Cell Rate.

"Maximum Channel Peak Cell Rate" (MCPCR) is the cell rate assigned to a particular channel in the absence of congestion.

"Current Channel Peak Cell Rate" (CCPCR) is the current cell rate at a particular time for a virtual channel and may equal the Maximum Channel Peak Cell Rate in the absence of congestion and may be less than the Maximum Channel Peak Cell Rate when congestion is present.

"Communication Interval" (CI) is a time period in a network, typically measured as a number of cell intervals.

"Average Cell Rate" (ACR) is the average number of cells transmitted over a communication interval in a virtual channel.

"Cell Transmission Interval" (CTI) is the average period of time for a cell to travel from one location in a network to another location in the network.

"Modification Interval" (MI) is the period of time required to modify a communication parameter.

Segmentation Unit—FIG. 10

In FIG. 10, the segmentation unit 103, the memory unit 102 and the host 101 are typical for a source such as source 4-S in the communication system of FIG. 1 and FIG. 2.

In FIG. 10, the common memory unit 102 includes a control memory 81 and a packet memory 83. The segmentation unit 103 includes a control memory interface (CM IF) 82, a packet memory interface (PM IF) 84, a host interface 127, and a cell interface 126. The cell interface includes an output cell buffer 86 and a rate control input 87. The segmentation unit 103 includes a core processor 128 which includes a logic control unit 117, a register array 114, and a counter 88. The counter 88 is stepped by an external clock 89. The control memory interface 82 connects the core processor 128 with the control memory 81. The control memory interface includes an address generator 113, an address register 110, a control unit 111 and a data register 112. The address generator 113 provides addresses to the address register 110 under control of information from the register array 114. The address from address register 110 addresses the control memory 81 to provide data into the data register 112 from memory 81 or to receive data from the data register 112 for storage in control memory 81. The control 111 connects with the logic control unit 117 for providing control signals to and from the control memory 81. The control unit 111 provides conventional read and write signals to the control memory 81 under control of the logic control unit 117.

In FIG. 10, the packet memory interface includes an address generator 123 connected to receive address data from the register array 114 for providing addresses into the address register 120. Address register 120 provides addresses for addressing the packet memory 83 for reading or writing information into or from the packet memory 83 under control of the control unit 121. The control unit 121 provides conventional read and write signals to the packet memory 83 under control of the logic control unit 117. The data register 122 provides data to the input cell buffer 86 for being processed by the cyclically redundancy code unit (CRC) 115. The data for the output cell is stored in the data register 122 from the packet memory 83 or from the constant bit rate (CBR) input 134.

The operation of the FIG. 10 source is to provide packetized cells or CBR information to the ATM link as an output to the output cell buffer 86. The header information for each cell in buffer 86 is received from the data register 112. The logic control unit 117 controls the logical operations necessary to segment the packets in the packet memory 83 into cells for output to buffer 86 or alternatively to output information from the CBR input. The details of the logic control unit 117 in the core processor 128 are shown in the following tables TABLE 1-1 and TABLE 1-2. TABLE 1-2 is a representation of pseudo code that defines, in a conventional manner, circuits in semiconductor chip technology. The pseudo code can be directly transformed into VHDL circuit specifications standardized by the IEEE.

TABLE 1-1
Segmentation Processor Terms

© COPYRIGHT 1992 Adapative Corporation

```
Preset operation mode (for entire network)

Congestion_Indicator :
          0 - Return_Cell      /* Congestion indicated by a
                                  return cell */
          1 - Packet_Loss      /* Congestion indicated by packet loss */
```

Preset static control variable (for each virtual channel)
    RC_Mode :
        000 - Recovery_Value = $2^0$ = 1
        001 - Recovery_Value = $2^1$ = 2
        010 - Recovery_Value = $2^2$ = 4
        011 - Recovery_Value = $2^3$ = 8
        100 - Recovery_Value = $2^4$ = 16
        101 - Disable_Recovery
        110 - Disable_RateControl
        111 - VirtualChannel_Shutdown
    TIQ :
        6-bit value - Time Interval Quota;
    CQ :
        6-bit value - Cell Quota;

State variables (in the chip)

Current_Descriptor :
        13-bit value - The descriptor number that acts as
                       a pointer to the descriptor table.

Previous_Descriptor :
        13-bit value - Descriptor previous to the
                       Current_Descriptor in the rate
                       queue.
                       This has no meaning if
                       Current_Descriptor = Start_Desc_Num.

State variables (for each rate queue)

Start_Desc_Num :
        13-bit value - Starting descriptor number of the
                       rate queue.
                       0 => no descriptors are queued on
                       the rate queue.

TABLE 1-1
Segmentation Processor Terms

© COPYRIGHT 1992 Adapative Corporation

State variables (for each virtual channel)

Cong_Level:
        000 - normal          /* Full Rate_Queue Xmit_Rate */
        001 - half            /* 1/2 Rate_Queue Xmit_Rate */
        010 - quarter         /* 1/4 Rate_Queue Xmit_Rate */
        011 - eighth          /* 1/8 Rate_Queue Xmit_Rate */
        100 - sixteenth       /* 1/16 Rate_Queue Xmit_Rate */
        101 - zero            /* no cell transmission */

RC_Inhibit:
        0 - Inhibit_Inactive
        1 - Inhibit_Active

Recovery_Count:

4-bit count

TI_Ctr :
    6-bit count – Time Interval Counter;

Cell_Ctr :
    11-bit count – Cell Counter;

Last_Desc_Num :
    13-bit value – Last descriptor in the Virt_Chan
        chain.
        0 => no descriptors are queued on
        this Virt_Chan.

State variables (for each Descriptor)

Virt_Chan :
    16-bit value – Virtual Channel the descriptor is
        associated with.

Next_Desc_in_RQ :
    13-bit value – Next descriptor in the Rate Queue
        chain.
        0 => This is the last descriptor
        on the rate queue.

Next_Desc_in_VC :
    13-bit value – Next descriptor in the Virt_Chan
        chain.
        0 => This is the last descriptor
        on the Virt_Chan chain.

TABLE 1-1
Segmentation Processor Terms

© COPYRIGHT 1992 Adapative Corporation

Packet_Address
    24-bit value :    Address pointer to the Buffer from which the
        packet is being segmented.

Packet_Length :
    16-bit value – Length of the packet in number of
        cells Residual_CRC :
    32-bit value :    Contains the running CRC of the packet Incoming Constant Bit Rate (CBR) traffic interface signal CBR_Xmit_Signal:
        0 – No_Cell_Waiting
        1 – CBR_cell_ready for transmission State variables (for CBR traffic)

CBR_Chan :
        16-bit value - Virtual Channel the CBR cell is
            associated with.

Incoming congestion signals

Cong_Signal:
        0 - No_Cell_Waiting      /* No return cell waiting */
        1 - Cell_Waiting         /* Return cell waiting for
                                          processing */

Cong_Signal_VCI:
        identifier            /* Virtual channel identifier of return
                  cell, typically 10 to 16 bits */

Pkt_Loss_Signal:
        0 - No_Signal_Waiting    /* No Pkt_Loss_Signal waiting */
        1 - Signal_Waiting       /* Packet loss signal waiting for
                                          processing */

Pkt_Loss_VCI:
        identifier            /* Virtual channel identifier of
                  Pkt_Loss_Signal, 10 to 16 bits typical*/

TABLE 1-1
Segmentation Processor Terms

© COPYRIGHT 1992 Adapative Corporation

Signals from timers (for each Rate_Queue)

Xmit_Time:
        1 - Active             /* Time to service this Rate_Queue */
        0 - Inactive          /* Not time to service this Rate_Queue */

X_count:
        4-bit count                         /* Count from X-counter */

Communication Queues (In Memory)

Packet_Ready_Queue:
        Circular Queue in memory (of descriptor numbers)
        loaded by the host to enqueue descriptors for
        segmentation.

Transfer_Comp_Queue:
        Circular Queue in memory (of descriptor numbers)
        loaded to enqueue descriptors after
        the packets have been segmented.

TABLE 1-2
Segmentation Processor Logic

© COPYRIGHT 1992 Adapative Corporation

/* Scheduler */

```
1     REPEAT
2       FOREACH Rate_Queue
3         IF (Xmit_Time [Rate_Queue] = Active)
4         THEN  Service_Rate_Queue (Rate_Queue)
5         ENDIF;
6         IF (CBR_Xmit_Signal = Active)              /* CBR Transmission*/
7         THEN  Xmit_Cell (CBR_Chan)
8         ENDIF;
9         Check_Cong_Signal;
10        Link_New_Descriptor;
11      ENDFOREACH;
12    ENDREPEAT;
13
14            /* Check for congestion signal waiting for processing */
15
16    PROCEDURE Check_Cong_Signal;
17      IF (Congestion_Indicator = Return_Cell)
18      THEN
19        IF (Cong_Signal = Cell_Waiting)
20        THEN Rate_Adjust (Cong_Signal_VCI);
21        ENDIF;
22      ELSE
23        IF (Pkt_Loss_Signal = Signal_Waiting)
24        THEN Rate_Adjust (Pkt_Loss_VCI);
25        ENDIF;
26      ENDIF;
27    ENDPROC;
28
29  /* Modify identified virtual channel rate upon receiving cong signal */
30
31    PROCEDURE Rate_Adjust (Virt_Chan);
32       READ for Virt_Chan (RC_Mode, RC_Inhibit, Recovery_Count,
33                           Cong_Level);
34      IF (RC_Mode !=Disable_RateControl) AND (RC_Inhibit !=Inhibit_Active)
35      THEN
36        IF (Cong_Level != zero)
37        THEN increment Cong_Level;
38        ENDIF;
39        RC_Inhibit := Inhibit_Active;
40        Recovery_Count := 0;
41      ENDIF;
42       WRITE for Virt_Chan (RC_Inhibit, Recovery_Count,
43                            Cong_Level);
44    ENDPROC;
```

TABLE 1-2
Segmentation Processor Logic

© COPYRIGHT 1992 Adapative Corporation

```
45                /* Service each virtual channel in rate queue */
46   ┌PROCEDURE Service_Rate_Queue (Rate_Queue);
47   │    Current_Descriptor = Start_Desc_Num ;
48   │    Previous_Descriptor = 0
49   │ ┌─WHILE (Current_Desc_Num > 0 )
50   │ │    READ for Current_Descriptor (Virt_Chan,    /* Step RCD */
51   │ │                                 Next_Desc_in_RQ
52   │ │                                 Next_Desc_in_VC,
53   │ │                                 Packet_Length,
54   │ │                                 Packet_Address,
55   │ │                                 Residual_CRC);
56   │ │    READ for Virt_Chan (RC_Mode, RC_Inhibit,/* Step RVc */
57   │ │                       Recovery_Count, Cong_Level,
58   │ │                       TIQ, CQ, TI_Ctr, Cell_Ctr,
59   │ │                       Last_Desc_Num);
60   │ │
61   │ │          /* Average Metering Routine */    /*Step Calc */
62   │ │  ┌─IF (TI_Ctr = 0)
63   │ │  ├─THEN
64   │ │  │    TI_Ctr = TIQ ;
65   │ │  ├─ELSE
66   │ │  │    TI_Ctr = max( (TI_Ctr - 1), 0);
67   │ │  └─END IF;
68   │ │  ┌─IF (TI_Ctr = 0)
69   │ │  ├─THEN
70   │ │  │    Cell_Ctr = max ( (Cell_Ctr + 1), CQ);
71   │ │  └─END IF;
72   │ │
73   │ │                  /* Xmit Cell Routine */
74   │ │
75   │ │  ┌─IF (RC_Mode != VC_Shutdown)
76   │ │  ├─THEN
77   │ │  │  ┌─IF  (Cong_Level = normal)
78   │ │  │  │  OR (Cong_Level = half    AND Xcount[Rate_Queue] = ???1)
79   │ │  │  │  OR (Cong_Level = quarter AND Xcount[Rate_Queue] = ??11)
80   │ │  │  │  OR (Cong_Level = eighth  AND Xcount[Rate_Queue] = ?111)
81   │ │  │  │  OR (Cong_Level = 1/16    AND Xcount[Rate_Queue] = 1111)
82   │ │  │  │  OR (Cong_Level = zero    AND Xcount[Rate_Queue] = 1111)
83   │ │  │  ├─THEN
84   │ │  │  │  ┌─IF ((Cong_Level != zero) AND (Cell_Ctr > 0))
85   │ │  │  │  ├─THEN
86   │ │  │  │  │    Cell_Ctr = max ((Cell_Ctr - 1),0);
87   │ │  │  │  │    Xmit_Cell (Virt_Chan);              /* Xmit next cell */
88   │ │  │  │  │    Packet_Length = Packet_Length - 1;
89   │ │  │  │  │                                  /* Step WCD */
90   │ │  │  │  │    WRITE for Current_Descriptor (Packet_Length;
91   │ │  │  │  │                                 Packet_Address,
```

TABLE 1-2
Segmentation Processor Logic

© COPYRIGHT 1992 Adapative Corporation

```
 92                              Residual_CRC);
 93              IF (Packet_Length = 0)
 94              THEN
 95                 Delink_Descriptor (Virt_Chan, Current_Descriptor,
 96                         Next_Desc_in_RQ, Next_Desc_in_VC,
 97                         Last_Desc_Num, Previous_Descriptor);
 98              ENDIF;
 99           ENDIF;
100           RC_Inhibit := Inhibit_Inactive;
101
102                    /* Xmit Rate Recovery Routine */
103           IF (RC_Mode != Disable_RateControl)
104              AND (RC_Mode != Disable_Recovery)
105           THEN
106              IF (Recovery_Count = Recovery_Value)
107              THEN
108                 IF (Cong_Level != normal)
109                 THEN decrement Cong_Level;
110                 ENDIF;
111                 Recovery_Count := 0;
112              ELSE
113                 Increment Recovery_Count;
114              ENDIF;
115           ENDIF;
116                                              /* Step WVc */
117           WRITE for Virt_Chan (RC_Inhibit, Recovery_Count,
118                                Cong_Level, TI_Ctr,
119                                Cell_Ctr);
120        ENDIF;
121     ENDIF;
122     Previous_Descriptor=Current_Descriptor;
123     Current_Descriptor = Next_Desc_in_RQ ;
124     IF (CBR_Xmit_Signal = Active)      /* CBR Transmission */
125     THEN  Xmit_Cell (CBR_Chan)
126     ENDIF;
127     Check_Cong_Signal;
128     Link_New_Descriptor;
129  ENDWHILE;
130 ENDPROC;
131
```

TABLE 1-2
Segmentation Processor Logic
© COPYRIGHT 1992 Adapative Corporation

```
132                     /* Transmission of a cell */
133
134   PROCEDURE Xmit_Cell ;
135       WHILE (Xmit_Cell_Header = Not_Done)        /* Step XCH */
136          Wait ;
137       END WHILE;
138       Read for Virt_Chan (Cell_Header);          /* Step RVH */
139       Load_Buffer_from_Packet_Memory;            /* Step LBPMem */
140       WHILE ((Load_Buffer_from_Packet_Memory = Not_Done) or
141              (Read for Virt_Chan = Not Done))
142          Wait ;
143       END WHILE;
144       Cell_Available_for_Transmission;
145   ENDPROC;
146
147              /* Link new descriptor for transmission */
148   PROCEDURE Link_New_Descriptor;
149       IF (Packet_Ready_Queue = Not_Empty)
150       THEN
151          Read for Packet_Ready_Queue (Current_Descriptor) ;
152          Read for Current_Descriptor (Virt_Chan);
153          Read for Virt_Chan(Last_Desc_Num);
154          IF (Last_Desc_Num = 0)        /* Link at head of Vertical chain */
155          THEN
156             Next_Desc_in_RQ = Start_Desc_Num ;
157             Next_Desc_in_VC = 0;
158             Start_Desc_Num = Current_Descriptor;
159             Last_Desc_Num = Current_Descriptor;
160             Write for Virt_Chan (Last_Desc_Num);
161             Write for Current_Descriptor(Next_Desc_in_RQ,Next_Desc_in_VC);
162          ELSE             /* Link at tail of the Horizontal chain */
163             Next_Desc_in_VC = Current_Descriptor ;
164             Write for Last_Desc_Num (Next_Desc_in_VC);
165             Next_Desc_in_VC = 0;
166             Last_Desc_Num = Current_Descriptor;
167             Write for Virt_Chan (Last_Desc_Num);
168             Write for Current_Descriptor (Next_Desc_in_VC);
169          ENDIF;
170       ENDIF;
171   ENDPROC;
```

TABLE 1-2
Segmentation Processor Logic

© COPYRIGHT 1992 Adapative Corporation

```
172   /* De-Linking of a descriptor after transmission has been completed */
173
174   PROCEDURE Delink_Descriptor (Virt_Chan, Current_Descriptor,
175                                 Next_Desc_in_RQ, Next_Desc_in_VC,
176                                 Last_Desc_Num, Previous_Descriptor);
177      IF (Current_Descriptor = Start_Desc_Num)
178                    /* Descriptor is at the head of the Rate Chain */
179      THEN
180         IF (Next_Desc_in_VC = 0)   / *Last descriptor horizontal chain */
181         THEN
182            Write for Transfer_Comp_Queue (Current_Descriptor);
183            Start_Desc_Num = Next_Desc_in_RQ;
184            Last_Desc_Num = 0;
185            Write for Virt_Chan (Last_Desc_Num);
186         ELSE             /* Link next descriptor in horizontal chain */
187            Write for Transfer_Comp_Queue (Current_Descriptor);
188            Start_Desc_Num = Next_Desc_in_VC;
189            Write for Current_Descriptor (Next_Desc_in_RQ);
190         ENDIF;
191      ELSE
192         IF (Next_Desc_in_VC = 0)
193                           /* Last descriptor in horizontal chain */
194         THEN
195            Write for Transfer_Comp_Queue (Current_Descriptor);
196            Last_Desc_Num = 0;
197            Write for Virt_Chan (Last_Desc_Num);
198            Write for Previous_Descriptor (Next_Desc_in_RQ);
199         ELSE             /* Link next descriptor in horizontal chain */
200            Write for Transfer_Comp_Queue (Current_Descriptor);
201            Current_Descriptor = Previous_Descriptor;
202            Write for Current_Descriptor (Next_Desc_in_VC);
203         ENDIF
204      ENDIF;
205   ENDPROC;
```

Reassembly Unit—FIG. 11

In FIG. 11, the reassembly unit 103', the memory unit 102' and the host 101' are typical for a destination such as destination 4-D in the communication system of FIG. 2.

In FIG. 11, the common memory unit 102' includes a control memory 81' and a packet memory 83'. The reassembly unit 103' includes a control memory interface (CM IF) 82', a packet memory interface (PM IF) 84', a host interface 127', and a cell interface 126'. The cell interface includes an input cell buffer 86' and a rate control output 87'. The reassembly unit 103' includes a core processor 128' which includes a logic control unit 117, a register array 114', and a counter 88'. The counter 88' is stepped by an external clock 89'. The control memory interface 82' connects the core processor 128' with the control memory 81'. The control memory interface includes an address generator 113', an address register 110', a control unit 111' and a data register 112'. The address generator 113' provides addresses to the address register 110' under control of information from the register array 114'. The address from address register 110' addresses the control memory 81' to provide data into the data register 112' from memory 81' or to receive data from the data register 112' for storage in control memory 81'. The control 111' connects with the logic control unit 117 for providing control signals to and from the control memory 81'. The control unit 111' provides conventional read and write signals to the control memory 81' under control of the logic control unit 117.

In FIG. 11, the packet memory interface includes an address generator 123' connected to receive address data from the register array 114' for providing addresses into the address register 120'. Address register 120' provides addresses for addressing the packet memory 83' for reading or writing information into or from the packet memory 83' under control of the control unit 121'. The control unit 121' provides conventional read and write signals to the packet memory 83' under control of the logic control unit 117. The data register 122' receives data from the input cell buffer 86' after being processed by the cyclically redundancy code unit (CRC) 118. The data from the input cell is stored in the data register 122′ for input to the packet memory 83′ or for output to the constant bit rate (CBR) output 134′.

The operation of the FIG. 11 destination is to receive packetized cells or CBR information from the ATM link as an input to the input cell buffer 86′. The header information from each cell in buffer 86′ is input to the logic control 117. The logic control unit 117 controls the logical operations necessary to reassemble the cells from buffer 86′ into packets in the packet memory 83′ or alternatively to output the cell information on the CBR output. The details of the logic control unit 117 in the core processor 128′ are shown in the following tables TABLE 2-1 and TABLE 2-2. TABLE 2-2 is a representation of pseudo code that defines, in a conventional manner, circuits in semiconductor chip technology. The pseudo code can be directly transformed into VHDL circuit specifications standardized by the IEEE.

TABLE 2-1
Reassembly Processor Terms

```
/* Reassembly algorithm for pipeline architecture */

Preset Control variables
    Cell_Type :
        One of the four types of the ATM cell.
        BOM : Beginning Of Message
        COM : Continuation Of Message
        EOM : End Of Message
        SSM · Single Segment Message
    Initial_CRC_Value :
        32-bit value : Value the CRC checker is initialized to
                       (All '1's).

Virt_Chan :
    Virtual Circuit Index extracted from the cell header

State variables (in the chip)
    VC_Sel :
        Virtual Channel range select.
    Packet_Aging_Timer :
        Timer used to determine the time interval for checking
        the state of packet in reassembly.
    Age_VCI :
        Index of the Virtual Circuit that is checked for aging
        packets.

State variables (for each cell)
    Header_VCI :
        Virtual Circuit Index contained in the Header of the
        ATM cell.
    BASize :
        Buffer Allocation size: This is carried in the BOM/SSM
        cells & can be used to obtain the correct size buffer.
```

State variables (for each Virt_Chan)
    Status :
        Inactive i.e., no packet is being reassembled on this
                Virt_Chan
        Active i.e., packet is being reassembled on this
                Virt_Chan
    Buffer_Descriptor :
        13-bit value - The descriptor number associated with
                    the buffer that the packet is being
                    reassembled in.
    Packet_Age_Limit :

TABLE 2-1
Reassembly Processor Terms

The initialization value for Packet_Timeout counter
that is used to age packets.

State variables (for each Buffer_Descriptor)
    Residual_CRC :
        32-bit value : Contains the running CRC of the packet
    Packet_Address
        24-bit value : Address pointer to the Buffer in which
                    the packet is being reassembled in.
    Packet_Length
        16-bit value : Length of the packet received in bytes.
    Buffer_Capacity
        16-bit value : Number of free locations left in the
                    buffer in bytes.
    Packet_Timeout :
        8-bit value : Indicates the time interval that the
                    packet has been active (during
                    reassembly).

Signals from the Input FIFO
    Cells_In_FIFO :
        1 - Available    /* At least one cell is available in the FIFO */
        0 - Empty        /* The FIFO is empty or has less than one cell */

Outgoing congestion signal
    Cong_Signal_VCI:
            identifier   /* Virtual channel identifier of return cell */

TABLE 2-2
Reassembly Processor Logic

© COPYRIGHT 1992 Adapative Corporation

```
                                    /* Scheduler */
 1   ┌─REPEAT
 2   │    ┌─IF (Cells_In_FIFO = Available)
 3   │    ├─THEN
 4   │    │    Receive_Cell ;
 5   │    ├─ELSEIF (Packet_Aging_Timer = Overflow)
 6   │    ├─THEN
 7   │    │    Age_Packet;
 8   │    └─ENDIF;
 9   └─ENDREPEAT
10
11   ┌─PROCEDURE Receive_Cell ;
12   │    Read_Cell_Header(n) ;                          /* Step RCH */
13   │    ┌─WHILE (Read_Cell_Header(n) = Not_Done)
14   │    │    Wait ;
15   │    └─END WHILE;
16   │    ┌─IF (Cell_Header=Return_Cell)
17   │    ├─THEN Cong_Signal_VCI = Header_VCI
18   │    │  Exit
19   │    └─ENDIF
20                        /* Mapping function for the VC */
21
22   │    ┌─IF (VC_Sel = 000)
23   │    │  THEN Virt_Chan = Header_VCI mod 2**16 ;
24   │    │  ELSEIF (VC_Sel = 001)
25   │    │  THEN Virt_Chan = Header_VCI mod 2**15 ;
26   │    │  ELSEIF (VC_Sel = 010)
27   │    │  THEN Virt_Chan = Header_VCI mod 2**14 ;
28   │    │  ELSEIF (VC_Sel = 011)
29   │    │  THEN Virt_Chan = Header_VCI mod 2**13 ;
30   │    │  ELSEIF (VC_Sel = 100)
31   │    │  THEN Virt_Chan = Header_VCI mod 2**12 ;
32   │    │  ELSEIF (VC_Sel = 101)
33   │    │  THEN Virt_Chan = Header_VCI mod 2**11 ;
34   │    │  ELSEIF (VC_Sel = 110)
35   │    │  THEN Virt_Chan = Header_VCI mod 2**10 ;
36   │    │  ELSE
37   │    │  THEN Virt_Chan = Header_VCI mod 2**9 ;
38   │    └─ENDIF;
39   │    Read for Virt_Chan (Status, Buffer_Descriptor,
40   │                        Packet_Age_Limit);         /* Step RVc */
41   │    ┌─WHILE (Read for Virt_Chan = Not_Done)
42   │    │    Wait ;
43   │    └─END WHILE;
44   │    ┌─IF ((Status = Active) AND
45   │    │      ((Cell_Type = COM) OR (Cell_Type = EOM)))
46   │    ├─THEN
```

TABLE 2-2
Reassembly Processor Logic

© COPYRIGHT 1992 Adapative Corporation

```
47        Read for Buffer Descriptor (Residual_CRC);                /* RDcrc */
48     -ELSEIF ((Status = Active) AND ((Cell_Type = BOM)OR(Cell_Type = SSM)))
49
50          /* Write back the descriptor and get new descriptor */
51
52        Residual_CRC = Initial_CRC_Value;
53        Write for Packet_Complete_Queue (Buffer_Descriptor) ;
54       -IF (BASize =< Sml_Buf_Siz)
55       -THEN
56          Read for Small_Free_Descriptor_Queue (Buffer_Descriptor) ;
57       -ELSE
58          Read for Large_Free_Descriptor_Queue (Buffer_Descriptor) ;
59       -ENDIF;
60     -ELSEIF ((Status = Inactive) AND
61            ((Cell_Type = BOM) OR (Cell_Type = SSM)))
62
63                /* Get new descriptor */
64
65        Residual_CRC = Initial_CRC_Value;
66       -IF (BASize =< Sml_Buf_Siz)
67       -THEN
68          Read for Small_Free_Descriptor_Queue (Buffer_Descriptor) ;
69       -ELSE
70          Read for Large_Free_Descriptor_Queue (Buffer_Descriptor) ;
71       -ENDIF;
72     -ELSE
73        Exit;                                                       /* Error cell */
74     -ENDIF;
75     -WHILE (Read for Buffer Descriptor = Not_Done)
76        Wait ;
77     -END WHILE;
78      Read_Cell_Payload(n) ;                                        /* Step RCPyld */
79      Read for Buffer Descriptor (Packet_Address, Packet_Length,
80                           Buffer_Capacity, Packet_Timeout); /* RDesc */
81     -WHILE ((Read_Cell_Payload(n) = Not_Done) or
82            (Read for Buffer Descriptor = Not_Done))
83        Wait ;
84     -END WHILE;
85     -WHILE (Payload_Transfer(n-1) = Not_Done)
86        Wait ;
87     -ENDWHILE;
88      Transfer_Cell_Payload(n);                        /* Transfer Payload to PM */
89     -IF (Cell_Type = BOM)
90     -THEN
91        Packet_Timeout = Packet_Age_Limit ;
92     -ENDIF;
93      Write for Buffer_Descriptor (Packet_Address, Packet_Length,
```

TABLE 2-2
Reassembly Processor Logic

© COPYRIGHT 1992 Adapative Corporation

```
 94                                    Buffer_Capacity, Residual_CRC,
 95                                    Packet_Timeout);              /* WDesc */
 96      IF ((Cell_Type = EOM) OR (Cell_Type = SSM))
 97      THEN
 98         Write for Packet_Complete_Queue (Buffer_Descriptor) ;
 99         Status = Inactive;
100      ELSE
101         Status = Active;
102      ENDIF;
103      Write for Virt_Chan (Status, Buffer_Descriptor);            /* WVc */
104   ENDPROC;
105
```

TABLE 2-2
Reassembly Processor Logic

© COPYRIGHT 1992 Adapative Corporation

```
106     PROCEDURE Age_Packet ;
107         Age_VCI = Age_VCI + 1;
108
109                   /* Mapping function for the VC */
110     IF (VC_Sel = 000)
111     THEN Virt_Chan = Age_VCI mod 2**16 ;
112     ELSEIF (VC_Sel = 001)
113     THEN Virt_Chan = Age_VCI mod 2**15 ;
114     ELSEIF (VC_Sel = 010)
115     THEN Virt_Chan = Age_VCI mod 2**14 ;
116     ELSEIF (VC_Sel = 011)
117     THEN Virt_Chan = Age_VCI mod 2**13 ;
118     ELSEIF (VC_Sel = 100)
119     THEN Virt_Chan = Age_VCI mod 2**12 ;
120     ELSEIF (VC_Sel = 101)
121     THEN Virt_Chan = Age_VCI mod 2**11 ;
122     ELSEIF (VC_Sel = 110)
123     THEN Virt_Chan = Age_VCI mod 2**10 ;
124     ELSE
125     THEN Virt_Chan = Age_VCI mod 2**9 ;
126     ENDIF;
127       Read for Virt_Chan (Status, Buffer_Descriptor);
128     WHILE (Read for Virt_Chan = Not_Done)
129         Wait ;
130     END WHILE;
131     IF (Status = Active)
132     THEN Read for Buffer Descriptor (Packet_Timeout);
133         WHILE (Read for Buffer Descriptor = Not_Done)
134             Wait ;
135         END WHILE;
136         Packet_Timeout = Packet_Timeout + 1;
137         Write for Buffer Descriptor (Packet_Timeout);
138         IF (Packet_Timeout = Overflow)
139         THEN
140             Status = Inactive;
141             Write for Virt_Chan (Status, Buffer_Descriptor);
142             Write for Packet_Complete_Queue(Buffer_Descriptor) ;
143         ENDIF;
144     ELSE
145         Exit;
146     ENDIF;
147
148     ENDPROC;
```

Operation Of Core Processing Unit

The core processor 128 of FIG. 10 as defined by TABLE 1-2 is a processing unit for controlling the processing of cells for each of the one or more virtual channels.

The core processing unit 128 is defined by TABLE 1-2. TABLE 1-2 includes a variable issue rate unit that is described in detail in the above-identified application entitled METHOD AND APPARATUS FOR REACTIVE CONGESTION CONTROL IN AN ASYNCHRONOUS TRANSFER MODE (ATM) NETWORK. In addition to variable issue rate unit, additional functions and units are added in the present specification which relate to two-dementional queueing, pipelining, packet aging and constant bit rate transmission.

Overall, the core processing unit 128 is under control of the scheduler circuits defined by lines 1 through 12 in TABLE 1-2. The basic timing of the core processing unit 128, as it appears in the segmentation unit of FIG. 10 is controlled by the Xmit_Time[Rate_Queue] of line 3 of TABLE 1-2. If the transmit time is active for the particular Rate_Queue (for example, the rate queue of FIG. 12), then the Service_Rate_Queue procedure at line 46 of TABLE 1-2 is entered. The service rate queue procedure services each virtual channel on the rate queue and carries out a number of routines including the average metering routine in lines 61 through 71, the transmit (Xmit) cell routine in lines 74 through 100 and lines 124 through 126, the transmit rate recovery routine in lines 102 through 120. After the procedure ends, a return is made to the scheduler where in line 6 a check is made to see whether or not a CBR transmission signal is active and if so, then a CBR cell is transmitted on a CBR channel.

The procedure for transmitting the cell appears in lines 134 through 145. If thereafter a return is made where in line 9 of the scheduler a check is made for a congestion signal which is the procedure from lines 16 through 27. Thereafter, a return is made to line 10 of the scheduler where a Link_New_Descriptor procedure is called which appears at lines 148 through 171.

The core processor 128 of TABLE 1-2 is a processing unit for controlling the processing of cells for each of the one or more virtual channels. The core processor includes control logic for controlling the processing of control information and data logic for controlling the processing of data. The control logic and the data logic operate to concurrently process data and control information for sustained transmission of cells in the ATM network up to the cell clock rate for each of the one or more virtual channels.

Referring to TABLE 1-2, the data logic includes part of the Xmit_Cell procedure starting at line 134. The data logic makes the cell available at the cell interface for transmission on the ATM link at line 144. The cell trasnmitted includes the cell header read at line 138 using the control logic and the control memory interface. The cell trasnmitted includes the cell payload read at line 139 using the data logic and the packet memory interface.

Two Dimensional Queues—FIG. 12

In FIG. 12, an example of the rate queue and the channel queue structures that are created in the control memory of FIG. 10 are shown. The rate queue which appears in the vertical direction in FIG. 12 includes a descriptor for each packet that is to be transfered over the ATM network with the same rate. The channel queue which appears in the horizontal direction in FIG. 12 includes a descriptor for each packet for the same virtual channel that is to be transfered over the ATM network with the same rate.

Referring to FIG. 12-1 each of the rectangles represensts a descriptor, X, and includes two pointers, a vertical pointer, v, and a horizontal pointer, h. Additionally, each descriptor includes other control information asscociated with a packet including for example, a length field, 1, indicating the number of bits (or cells) in the packet. In the packet descriptor, X indicates the identity of the particular packet being processed by the queue of FIG. 10. For each descriptor, X, an associated rate queue pointer, v, identifies the next-in-order descriptor in the rate queue (vertical chain) that forms a linked list of packets having the same transmission rate. In FIG. 12-1, Descriptor6 (X=6) is at the tail of the rate queue since the next-in-order vertical packet is Descriptor0, that is v=0 for Descriptor6. Descriptor1 is at the head of the linked list. Descriptor1 has a vertical pointer 3 pointing to the next-in-order packet 3. Descriptor3 has a pointer 4 (v=4) which points to Descriptor4. Descriptor4 has a pointer 6 which points to the tail of the queue Descriptor6. The rate queue in the vertical direction includes Descriptor1, Descriptor3, Descriptor4 and Descriptor6.

In addition to the rate queue, one or more channel queues are shown in the horizontal direction. Descriptor1 has a horizontal pointer 2 which points to Descriptor2. Descriptor2 has a horizontal pointer, h=0, and a vertical pointer that is blank. Accordingly, Descriptor2 is at the tail of the horizontal channel queue which includes Descriptor1 and Descriptor2 and which represent one virtual channel. In a similar manner, Descriptor5 is at the tail of the channel queue that includes Descriptor4 and Descriptor5. Similarly, Descriptor7 is at the tail of the channel queue that includes Descriptor6 and Descriptor7.

In FIG. 12-2, the queue structure of FIG. 12-1 is modified by the addition of an additional descriptor, Descriptor8, to the channel queue including the Descriptor4 and Descriptor5. Note that the addition of Descriptor8 causes the h pointer in Descriptor5 to be changed from a 0 as it appeared in FIG. 12-1 to an 8 as it appears in FIG. 12-2. The 8 is a pointer to the Descriptor8 added to the channel queue of Descriptor4 and Descriptor5.

In FIG. 12-3, Descriptor3 is removed from the rate queue. Removal of Descriptor3 is accompanied by changing the v pointer in Descriptor1 from a 3 as it appeared in FIG. 12-2 to a 4 as it appears in FIG. 12-3 thereby pointing to the next-in-order Descriptor4.

In FIG. 12-4, the Descriptor4 of FIG. 12-3 is removed. This removal is accompanied by changing the pointer in Descriptor1 as it appeared in FIG. 12-3 from a 4 to a 5 as it appears in FIG. 12-4. Similarly, Descriptor5 has its vertical pointer changed from a blank to a 6 to thereby point to Descriptor6 which is at the tail of the rate (vertical) queue.

FIG. 12 is an example of one of possibly many rate queues concurrently processed by core processing unit 128 of FIG. 10. The core processing unit 128 of FIG. 10 adds and removes packet descriptors from the queues. In operation, the core processing unit 128 is controlled by the scheduler circuits defined by lines 1 through 12 in TABLE 1-2.

Referring to TABLE 1-2, the linking of a new descriptor for either the vertical rate queue or the horizontal channel queue is controlled by the Link_New_Descriptor procedure starting at line 148 in TABLE 1-2. The insertion at the head of the vertical rate queue commences at line 154 and the insertion at the tail of the horizontal channel queue commences at line 162.

In TABLE 1-2, the delinking of a descriptor from either the vertical rate queue or the horizontal channel queue is controlled by the Delink_Descriptor procedure starting at line 174 in TABLE 1-2. The removal to collaspe the vertical rate queue commences at line 182 or line 195 and the removal to shrink the horizontal channel queue commences at line 187 or line 200.

Figure 13:
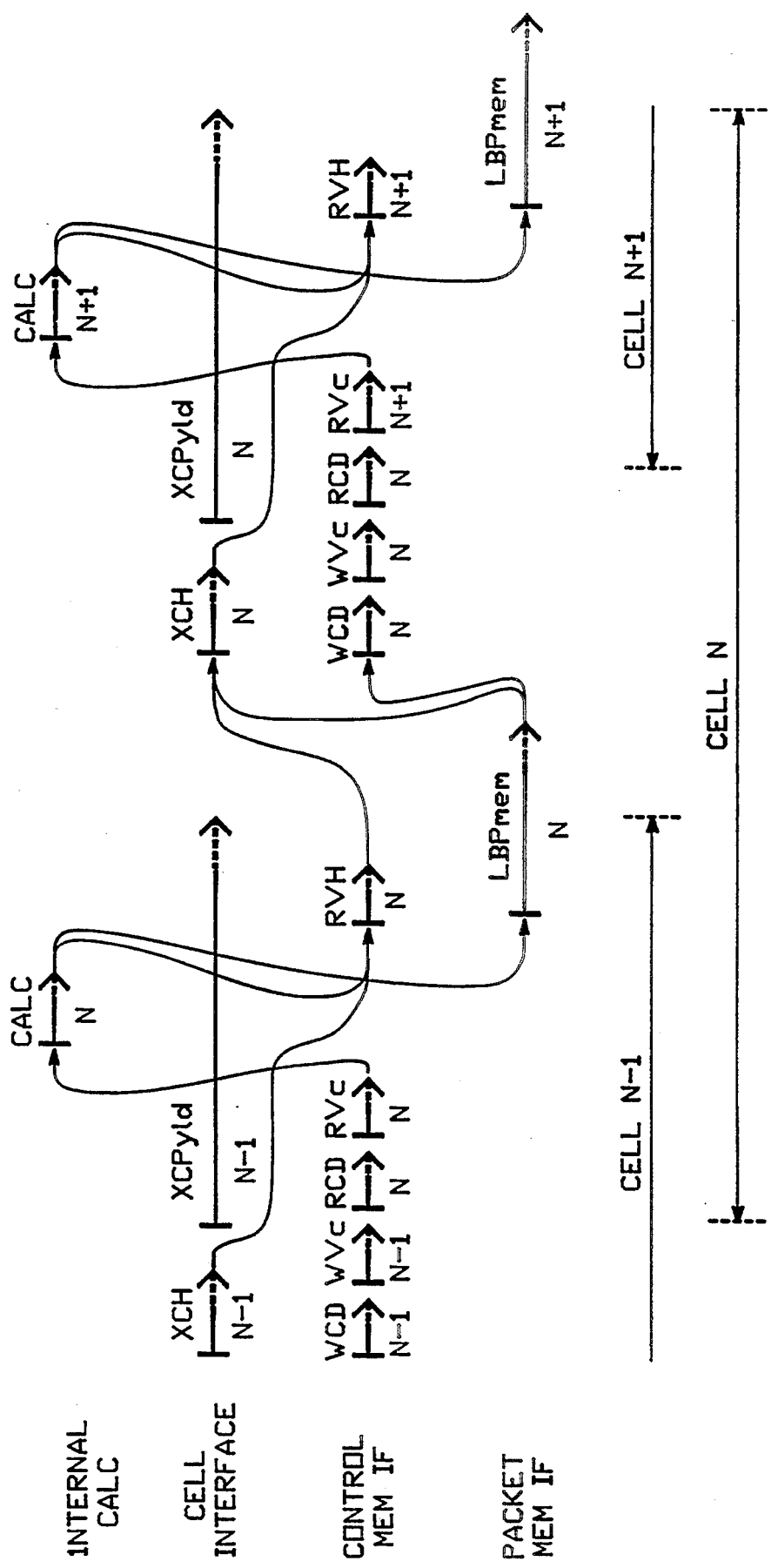
FIG. 13 depicts a timing diagram representing the pipelining operation of the segmentation unit in the source of FIG. 10.

Segmentation Unit Pipelined operation—FIG. 13

Referring to FIG. 13, an example of the pipelined operation of the segmentation core processor 128 of FIG. 10 is represented. The processing for the cell interface, the control memory interface, the host interface and the packet memory interface, together with internal calculations for the processor are shown for a current cell N, for a prior cell N-1 and for a next cell N+1.

In FIG. 13, the straight lines opposite the cell interface, the control memory interface, and the packet memory interface represent processing that occurs by those interfaces, respectively. In FIG. 13, the curved lines between straight lines of the cell interface, the control memory interface, and the packet memory interface represent timing dependences between those interfaces. A proceess ending at the beginning of a curved arrow along one interface must complete before the process beginning at the end of the curved arrow at another interface.

It is apparent from FIG. 13 that the cell processing for cell N-1 overlaps the cell processing for cell N and similarly that the processing for cell N overlaps the processing for cell N+1. By this pipelined overlapping of the processing for different cells, the cell rate of transmission is maximized.

In FIG. 13, the prefix W generally refers to a write operation, the prefix R generally refers to a read operation and the prefix X generally refers to a transmit operation. The legends in FIG. 13 are correlated to the comment fields in TABLE 1-2 to show the correlation between the TABLE 1-2 circuit specification logic and the pipelined operation thereof as indicated in FIG. 13. Through pipelining the processing of information for cells for operations at each of the cell interfaces, the core processing unit 128 in the source of FIG. 10 is able to to concurrently process data and control information for sustained transmission of cells in the ATM network up to the cell clock rate for each of the one or more virtual channels.

Referring to FIG. 13, each cell transmitted has a header portion and a payload portion. For the cell N, the header portion is determined at the control memory interface by the read virtual header (RVH) operation of cell N. Concurrently with the reading of the header for cell N by the control memory interface, the payload information for cell N is read by the packet memory interface during the load LBPmem operation for cell N. While the header and payload for cell N are being read by the control memory interface and the packet memory interface, during the RVH and LBPmen operations for cell N, respectively, the data transmission for the N-1 cell payload is being concurrently processed by the .cell interface during the XCPyld operation for cell N-1.

After these operations are complete for cell N, the header for cell N is transmitted during the XCH operation which is then followed by the payload transmitted in the XCPyld operation for cell N. At the same time that the header and payload are transmitted by the cell interface, the control memory interface is performing concurrently the WCD, WVc, RCD, and RVC operations. In this manner it can be seen that the pipelined operations over the various interfaces including the cell interface the control memory interface and the packet memory interface are concurrently operating.

Figure 14:
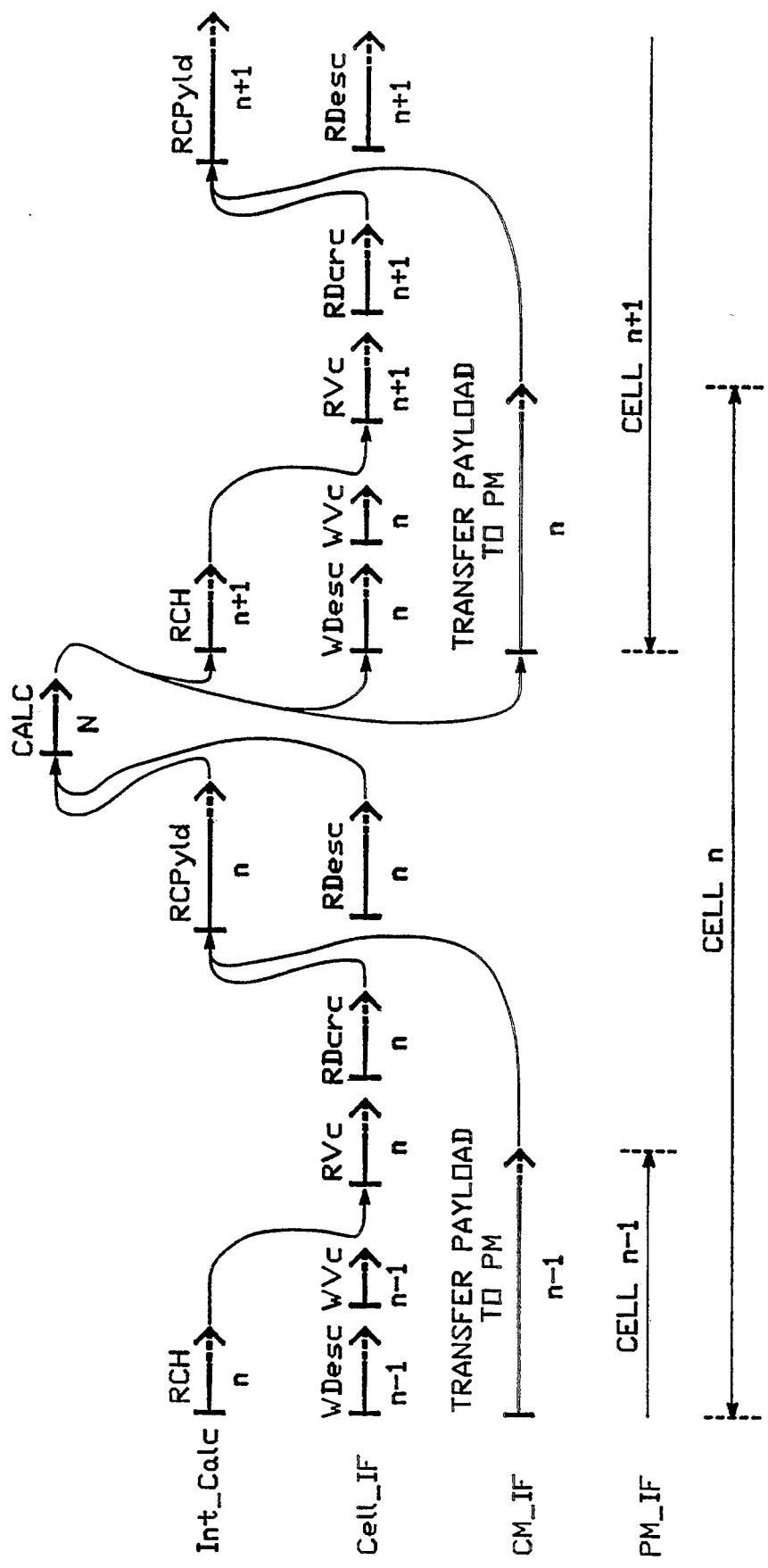
FIG. 14 depicts a timing diagram representing the pipelining operation of the reassembly unit in the destination of FIG. 11.

Reassembly Unit Pipelined Operation—FIG. 14

Referring to FIG. 14, the pipelined processing of the core processor 128' in the reassembly unit 103' of FIG. 11 is shown. The processing in the the core processor 128' is pipelined in that the processing of cell N-1 is concurrent with the processing for cell N and the processing for cell N is concurrent with the processing for cell N+1. The legends in FIG. 14 are correlated to the comment fields in TABLE 2-2 to show the correlation between the TABLE 2-2 circuit specification logic and the pipelined operation thereof as indicated in FIG. 14. Through pipelining the processing of information for cells for operations at each of the cell interfaces, the core processing unit 128' in the destination of FIG. 11 is able to to concurrently process data and control information for sustained reception of cells in the ATM network up to the cell clock rate for each of the one or more virtual channels.

Combined Segmentation And Reassembly Operation—FIG. 15

Referring to FIG. 15, a schematic representation of the segmentation operation is a source and the corresponding operation in a destination is shown for a typical packet. Each packet in FIG. 15 like the Descriptor1 packet 141 includes a plurality of cells shown as $C(1,1)$, $C(1,2)$, ..., $C(1,n)$. In a similar manner, the additional Descriptor2 and Descriptor3 packets 142 and 143 in FIG. 15 have Descriptor2 cells and Descriptor3 cells. The Descriptor2 cells are $C(2,1)$, $C(2,2)$, $C(2,n)$. Similarly, the Descriptor3 cells are $C(3,1)$, $C(3,2)$, ..., $C(3,n)$. The initial cells on the ATM link occur, for example, as as $C(1,1)$, $C(2,1)$, $C(3,1)$, and so forth up to $C(n+1)$. These initial cells are then subsequently followed by cells $C(1,2)$, $C(2,2)$, $C(3,2)$, and so forth up to $C(3,n)$. In this way, outgoing cells from different packets are interleaved on the ATM link. The cells from each packet are received at the reassembly processor in the destination in the same order that they are sent by the segmentation processor in the source. The interleaved cells in the reassembly operation are reassembled into the packets so that the cells in the packet 140' at the destination are in the same order after the reassembly namely $C(1,1)$, $C(1,2)$, ..., $C(1,n)$.

Average Rate Metering—FIGS. 16–20

Referring to FIG. 16, the cell clock has cell periods from 0 through 31 which establish the cell clock rate.

In FIG. 17, a request on a particular channel to send a cell occurs as an Xmit_Cell request in TABLE 1-2. At time 0 of the cell clock in FIG. 16, two requests to transmit cells were pending. With the average rate metering routine in TABLE 1-2, on average only one cell can be transmitted for each timeout of the TI counter. Referring to FIG. 18, the TI counter counts down from the maximum count (TIQ) to the minimum count (0) during the 0 to 4 clocks and resets on clock 5 to the maximum count (4 in the particular example shown). The TI counting operation is shown in the average metering routine on lines 61–71 of TABLE 1-2.

In FIG. 19, the cell counter is an accumulator that accumulates the number of opportunities that are available to transmit cells. The cell counter is incremented each time the TI counter is counted down to 0. The cell counter is decremented each time a cell transmission occurs. A data transmission is shown in FIG. 20. Referring to FIG. 19, at time 4, the cell counter is incremented at the time that the TI counter is decremented to 0. Cell counter time 4 indicates that one cell can be transmitted in accordance with the average metering routine. Accordingly, because a data request is pending as shown by FIG. 17 data is actually transmitted at time 5 in FIG. 20 thereby causing the cell counter to be decremented at T5 and reducing the data request to transmit to one as shown in FIG. 17. Similarly, the cell counter of FIG. 19 is incremented again at time 9 when the TI counter times out at time 9 as shown in FIG. 18. Since a request is pending as indicated in FIG. 17 a data cell is transmitted at time 10 as shown in FIG. 20 and the cell counter is decremented back to 0. At that time as shown in FIG. 17, no more data requests to transmit are pending and at time 14 when the TI counter times out, the cell counter is again incremented. Again at time 19 when the TI counter decrements to 0, again no data request to transmit is pending and hence the cell counter is incremented to two at time 19. Similarly at time 24 when the TI counter times out the cell counter is incremented to a count of three. Thereafter when a data request to transmit occurs for a request to transmit 4 cells, cells are transmitted at times 26, 27 and 28 for a total of 3 cells. Similarly, the cell counter is decremented from its value of 3 to 0 corresponding to the transmission of the 3 cells at times 26, 27, and 28 in FIG. 20. At time 28, the cell counter is at 0 meaning that the fourth cell to be transmitted by the data request is still pending but cannot be sent at time 29. However, when at time 29 when the TI counter again is decremented to 0, the cell counter of FIG. 19 is incremented to one thereby allowing a further data transmission at time 30 to occur so that the data request queue is reset to 0 after time 31 with no further requests pending, Referring to TABLE 1-2, the operation of the TI counter is as follows. If as in line 62 the TI_Ctr counter is equal to 0 then in line 64 the TI counter is reset to the maximum value of TIQ. If it is greater then 0, then the TI counter is decremented by 1. If the TI counter is equal to 0 then the cell counter is incremented by 1 up to a maximum value of CQ.

The operation continues in line 84 of TABLE 1-2 where in line 84 if the cell counter is greater than 0, then the cell counter is decremented by 1 and in line 87, a transmission of a cell occurs on the virtual channel.

In TABLE 1-2, issue rate unit includes in lines 61 through 71 means for establishing an average rate, in lines 102 to 115 for the Xmit rate recovery routine means to restore the transmission rate in response to the absence of congestion signals, and in line 84 means to prevent the average transmission rate from exceeding the average rate.

Packet Aging

The operation of the reassembly processor of TABLE 2-2 is controlled by the scheduler and lines 1 through 9. Whenever input data occurs in the buffer from the ATM link, then the Receive_Cell procedure is called in line 4 where the procedure appears in lines 11 through 104. When not busy carrying out the receive cell operation, and sufficient time has elapsed so that the packet aging timer of line 5 has overflowed, then the age-packet routine of lines 106 through 148 is called. The time 5 packet aging timer is a common timer used for all packets. Although the timer is common, each packet can have a different aging time. Referring to the lines 89 through 92, each cell that is received is examined to determine if it is a beginning of message (BOM) cell and if it is then the packet time out for that packet is set to the packet age limit. The packet age limit is the starting count which is then incremented each time the age packet routine is executed. The packet timeout value set in line 91 for a particular cell is written in line 93 into the control memory (WDesc operation in FIG. 14.). In the age packet procedure, the package timeout is incremented by one in line 136 and the incremented packet timeout is written into the buffer descriptor. If the packet timeout has been incremented to the overflow condition then the packet is discarded by setting the status in line 140 to inactive and writing the inactive status for the virtual channel in line 141 into the status and buffer descriptor fields. Finally in line 142 the Write for Packet_Complete_Queue makes the packet available to the host unit.

Further and Other Embodiments

While the invention has been particularly shown and described with reference to preferred embodiments thereof, it will be understood by those skilled in the art that the foregoing and other changes in form and details may be made therein without departing from the spirit and scope of the invention.

What is claimed is:

1. A communication unit for use in an asynchronous transfer mode ATM network where a host unit processes packets for communication over one or more virtual channels in the network, where each packet is segmented into a plurality of associated cells for transmission over the network at a cell clock rate, where each packet has data and control information, and where memory means stores control information and data for packets and for cells associated with the packets for each of the one or more virtual channels, said communication unit comprising, a memory interface for interfacing the communication unit to the memory means, a cell interface for interfacing the communication unit to the ATM network, core processor means for controlling the processing of cells for each of the one or more virtual channels, said core processor means including control logic means for controlling the processing of control information and data logic means for controlling the processing of data, said control logic means and said data logic means operating to concurrently process data and control information for sustained transmission of cells in the ATM network up to the cell clock rate for each of the one or more virtual channels.

2. The communication unit of claim 1 wherein said communication processing unit is a segmentation unit wherein packets to be transmitted are segmented into a plurality of cells.

3. The communication unit of claim 1 wherein said communication processing unit is a reassembly unit wherein cells transmitted are reassembled into packets.

4. The communication unit of claim 3 wherein said logic control means includes, for each packet, means for storing a packet age value indicating the length of time that the packet has been active in transmission in the ATM network, means for discarding packets that have a packet age value exceeding an age limit.

5. The communication unit of claim 1 wherein said communication processing unit includes a host interface for connection to said host unit and provides information at said memory interface, said cell interface, and said host interface for each of the one or more virtual channels.

6. The communication unit of claim 1 wherein common memory includes a control memory and a data memory and wherein said memory interface includes a control interface and a data interface for interfacing said communication processing unit to said control memory and said data memory, respectively.

7. The communication unit of claim 6 wherein said communication processing unit is a pipelined processing unit that concurrently processes cells for packets for a plurality of channels and concurrently provides cell information at said control interface, said data interface, and said cell interface.

8. The communication unit of claim 1 wherein said logic control means includes means for storing two-dimensional queues of descriptors in said control memory including,
   means for storing first-dimension rate queues for queueing descriptors for cells of different channels having cells to be transmitted, and
   means for storing second-dimension channel queues, one channel queue for each channel having a descriptor in the rate queue where each channel queue queues descriptors for cells of the same channel.

9. The communication unit of claim 8 wherein said logic control means includes means for storing a different rate queue for each transmission rate.

10. The communication unit of claim 9 wherein said logic control means includes means for storing a plurality of different channel queues for each rate queue.

11. The communication unit of claim 9 wherein said logic control means includes means for storing each rate queue as a linked list of descriptors, each descriptor in the rate queue identifying a descriptor from a different one of the channels having cells to be transmitted at the rate for the particular rate queue.

12. The communication unit of claim 10 wherein said logic control means includes means for storing each channel queue as a linked list of descriptors, each descriptor identifying a packet to be transmitted, for an associated one of the channels, where the linked list of descriptors for the channel queue identifies all the packets, for the associated one of the channels, to be transmitted.

13. The communication unit of claim 1 wherein said logic control means includes means for controlling the issue rate of cells to the ATM network based on average rate metering.

14. A communication system having reactive congestion control comprising,
   a plurality of sources, each source including a modifiable issue rate unit which transmits forward information signals at different transmission rates in response to congestion signals and in response to average rate metering, said issue rate unit decreasing the transmission rate in response to congestion signals,
   a plurality of destinations,
   one or more nodes forming an asynchronous transfer mode (ATM) network connecting the sources to the destinations, each node including,
      a forward path for transfer of information in a forward direction toward a destination through the network,
      a return path for returning congestion signals in a reverse direction through the network toward a source,
      congestion signal generating means for generating congestion signals in response to congestion in the node,
   said network having a plurality of virtual channels where, for each virtual channel,
      one of said plurality of sources is linked to one of said plurality of destinations through said network by linking forward paths from one or more nodes, and wherein said issue rate unit transmits forward information signals at different transmission rates in response to congestion signals over the virtual channel,
      said one of said plurality of destinations is linked to said one of said plurality of sources through said network by linking return paths from said one or more nodes,
      the congestion signal generating means generates said congestion signals for the virtual channel in response to congestion.

15. The communication system of claim 14 wherein said issue rate unit includes means for establishing an average rate, means to restore the transmission rate in response to the absence of congestion signals, and means to prevent the average transmission rate from exceeding the average rate.

16. The communication system of claim 14 wherein the transmission interval for a congestion signal returning from a congested node to the source is short thereby enabling the issue rate unit to reactively modify the transmission rate and thereby reduce congestion.

17. The communication system of claim 14 wherein the transmission interval for a congestion signal returning from a congested node to the source is less than the interval between information signals transmitted over the virtual channel whereby the issue rate unit reactively responds to modify the transmission rate to reduce congestion.

18. The communication system of claim 14 wherein the transmission interval for congestion signal returning from a congested node to the source is less than ten intervals between information signals transmitted over the virtual channel whereby the issue rate unit reactively responds to modify the transmission rate to reduce congestion.

19. The communication system of claim 14 wherein the processing time required to generate congestion signal at each node is much less than said transmission interval for congestion signal.

20. The communication system of claim 14 wherein said issue rate unit has means for decreasing said transmission rate exponentially in response to congestion signals.

21. The communication system of claim 20 wherein said issue rate unit includes means for establishing an average rate, means for decreasing said transmission rate due to congestion signals, and means for increasing said transmission rate exponentially in response to the absence of congestion signals, and means to prevent the average transmission rate from exceeding the average rate.

22. The communication system of claim 21 including means for increasing said transmission rate at a rate less than the rate of decreasing said transmission rate.

23. The communication system of claim 14 wherein said forward information is segmented into cells, each cell including a virtual channel identifier, and wherein each node includes a switching element, each switching element including,
a switch fabric,
a plurality of port controllers interconnected by said switch fabric, each of said port controllers including,
an input controller,
an output controller,
congestion detection means for detecting congestion in the node,
reversing means for copying a cell, having a virtual channel identifier, from the forward path to the return path to thereby generate a congestion signal on said return path.

24. The communication system of claim 23 wherein said reversing means includes reverse marker means for marking copied cells with a return path indicator whereby return cells are distinguished from forward cells.

25. The communication system of claim 23 wherein each of said port controllers includes selector means for selecting cells from one virtual channel for the forward path or from another virtual channel for the return path.

26. The communication system of claim 25 wherein said selector means grants priority to cells from the return path whereby congestion signals are given priority in the network.

27. The communication system of claim 23 wherein said forward paths include queues for storing cells in the forward direction, each of said queues including means for providing a queue-level signal, as a function of the fullness of the queue, to form the congestion signal.

28. The communication system of claim 27 wherein said forward information is segmented into cells, each cell including a virtual channel identifier, and wherein each node includes a switching element, each switching element including,
a switch fabric,
a plurality of port controllers interconnected by said switch fabric, each port controller connected to a communication link and each port controller including,
an input controller for said link including a translator for receiving the virtual channel identifier of incoming cells on the link and responsively translating the input virtual channel identifier of incoming cells to an output virtual channel identifier of outgoing cells for another link for another port controller connected to said switch fabric,
an output controller for said link,
congestion detection means for detecting congestion in the node,
reversing means for copying a cell, having a virtual channel identifier, from the forward path to the return path to thereby generate a congestion signal on said return path, said reversing means connecting said output virtual channel identifier to be reverse translated to said input virtual channel identifier whereby the virtual channel identifiers for cells in the forward path and in the return path over the link are the same.

29. The communication system of claim 23 wherein said port controller includes one or more queues connected in parallel for queueing cells for the forward path and the return path of a link, said queues providing queue-level signals indicating the fullness of the queues and including selection means for selecting cells from said queues.

30. The communication system of claim 29 wherein said selector means grants priority to cells from the return path whereby congestion signals are given priority in the network.

31. The communication system of claim 28 wherein said reversing means includes reverse marker means for marking copied cells with a return path indicator whereby return cells are distinguished from forward cells.

32. The communication system of claim 28 wherein each of said port controllers includes selector means for selecting cells from one virtual channel for the forward path or from another virtual channel for the return path.

33. The communication system of claim 28 wherein said selector means grants priority to cells from the return path whereby congestion signals are given priority in the network.

34. The communication system of claim 28 wherein said forward paths include queues for storing cells in the forward direction, each of said queues including means for providing a queue-level signal, as a function of the fullness of the queue, to form the congestion signal.

35. A wide-area communication system having local reactive congestion control comprising,
a plurality of local communication systems, each local communication system including,
a plurality of local sources, each local source including a modifiable issue rate unit which transmits forward information signals at different transmission rates, said issue rate unit decreasing the transmission rate in response to the presence of congestion signals and increasing the transmission rate in response to the absence of congestion signals and in response to average rate metering,
a plurality of local destinations,
one or more local nodes forming an asynchronous transfer mode (ATM) local network connecting the sources to the destinations, each local node including,
a forward path for transfer of information at different selectable transmission rates in a forward direction toward a destination through the network,
a return path for returning congestion signals in a reverse direction through the network toward a source,
congestion signal generating means for generating congestion signals in response to congestion in the local node,
said network having a plurality of virtual channels where, for each virtual channel,
one of said plurality of local sources is linked to one of said plurality of local destinations through said local network by linking forward paths from one or more local nodes, and wherein said issue rate unit transmits forward information signals at different transmission rates in response to congestion signals over the virtual channel,
said one of said plurality of local destinations is linked to said one of said plurality of local sources through said network by linking return paths from said one or more nodes,
the congestion signal generating means generates said congestion signals for the virtual channel in response to congestion, one or more wide-area sources connected to one of said local networks, one or more wide-area destinations connected to another one of said local networks, a plurality of local network links interconnecting two or more local networks to form a wide-area network, said wide-area network having a plurality of virtual channels where, for each virtual channel, one of said plurality of wide-area sources is linked to one of said plurality of wide-area destinations through a plurality of said local networks over said local networks and said local network links.

36. The wide-area communication system of claim 35 wherein the transmission interval for a congestion signal returning from a congested local node to the local source is short thereby enabling the issue rate units in local sources to reactively modify the transmission rates of the local sources and thereby reduce congestion in the wide-area communication system.

37. The wide-area communication system of claim 35 wherein the transmission interval for a congestion signal returning from a congested local node to the local source is less than the interval between information signals transmitted over the virtual channel whereby the issue rate units in local sources reactively respond to modify the transmission rates of the local sources and thereby reduce congestion in the wide-area communication system.

38. The wide-area communication system of claim 35 wherein the transmission interval for a congestion signal returning from a congested local node to the local source is less than ten intervals between information signals transmitted over the virtual channel whereby the issue rate units in local sources reactively respond to modify the transmission rates of the local sources and thereby reduce congestion in the wide-area communication system.

39. The wide-area communication system of claim 35 wherein the processing time required to generate a congestion signal at each node is much less than said transmission interval for a congestion signal.

40. The wide-area communication system of claim 35 wherein said issue rate unit has means for decreasing said transmission rate exponentially in response to a congestion signal.

41. The wide-area communication system of claim 40 wherein said issue rate unit, after decreasing said transmission rate, has means for increasing said transmission rate exponentially in response to the absence of a congestion signal.

42. The wide-area communication system of claim 41 wherein the rate of increasing said transmission rate is less than the rate of decreasing said transmission rate.

43. The wide-area communication system of claim 35 wherein said forward information is segmented into cells, each cell including a virtual channel identifier, and wherein each node includes a switching element, each switching element including, a switch fabric, a plurality of port controllers interconnected by said switch fabric, each of said port controllers including, an input controller, and an output controller, congestion detection means for detecting congestion in the node, reversing means for copying a cell, having a virtual channel identifier, from the forward path to the return path to thereby generate a congestion signal on said return path.

44. The wide-area communication system of claim 43 wherein said reversing means includes reverse marker means for marking copied cells with a return path indicator whereby return cells can be distinguished from forward cells.

45. The wide-area communication system of claim 43 wherein each of said port controllers includes selector means for selecting cells from one virtual channel for the forward path or from another virtual channel for the return path.

46. The wide-area communication system of claim 45 wherein said selector means grants priority to cells from the return path whereby congestion signals are given priority in the network.

47. The wide-area communication system of claim 43 wherein said forward paths include queues for storing cells in the forward direction, each of said queues including means for providing a queue-level signal, as a function of the fullness of the queue, to form the congestion signal in response to the queue-level signal.

48. The wide-area communication system of claim 35 wherein said forward information is segmented into cells, each cell including a virtual channel identifier, and wherein each node includes a switching element, each switching element including, a switch fabric, a plurality of port controllers interconnected by said switch fabric, each port controller connected to a communication link and each port controller including, an input controller for said link including a translator for receiving the virtual channel identifier of incoming cells on the link and responsively translating the input virtual channel identifier of incoming cells to an output virtual channel identifier of outgoing cells for another link for another port controller connected to said switch fabric, an output controller for said link, congestion detection means for detecting congestion in the node, reversing means for copying a cell, having a virtual channel identifier, from the forward path to the return path to thereby generate a congestion signal on said return path, said reversing means connecting said output virtual channel identifier to be reverse translated to said input virtual channel identifier whereby the virtual channel identifiers for cells in the forward path and in the return path over the link are the same.

49. The wide-area communication system of claim 48 wherein said port controller includes one or more queues connected in parallel for queueing cells for the forward path and the return path of a link, said queues providing queue-level signals indicating the fullness of the queues and including selection means for selecting cells from said queues.

50. The wide-area communication system of claim 49 wherein said selector means grants priority to cells from the return path whereby congestion signals are given priority in the network.

51. The wide-area communication system of claim 48 wherein said reversing means includes reverse marker means for marking copied cells with a return path indicator whereby return cells can be distinguished from forward cells.

52. The wide-area communication system of claim 48 wherein each of said port controllers includes selector means for selecting cells from one virtual channel for the forward path or from another virtual channel for the return path.

53. The wide-area communication system of claim 48 wherein said selector means grants priority to cells from the return path whereby congestion signals are given priority in the network.

54. The wide-area communication system of claim 48 wherein said forward paths include queues for storing cells in the forward direction, each of said queues including means for providing a queue-level signal, as a function of the fullness of the queue, to form the congestion signal in response to the queue-level signal.

55. A communication system of one or more virtual channels having reactive congestion control comprising,
   a plurality of sources, each source including a modifiable issue rate unit which transmits forward information signals at different transmission rates in response to congestion signals, said issue rate unit transmitting, for each of one or more channels, at a maximum-channel-peak-cell-rate in the absence of congestion and at a rate below the maximum-channel-peak-cell-rate for each channel experiencing congestion and transmitting under control of average rate metering,
   a plurality of destinations,
   one or more nodes forming an asynchronous transfer mode (ATM) network connecting sources to destinations, each node including,
      a forward path for transfer of information in a forward direction toward a destination through the network,
      a return path for returning congestion signals in a reverse direction through the network toward a source,
      congestion signal generating means for generating congestion signals in response to congestion in the node,
   for each of one or more virtual channels in the network,
      one of said plurality of sources is linked to one of said plurality of destinations through said network by linking forward paths from one or more nodes, and wherein said issue rate unit transmits forward information signals at different transmission rates in response to congestion signals over the virtual channel,
      said one of said plurality of destinations is linked to said one of said plurality of sources through said network by linking return paths from said one or more nodes,
      the congestion signal generating means generates said congestion signals for the virtual channel in response to congestion.

56. A communication system having one or more virtual channels each having reactive control and average rate metering where said system includes,
   one or more multiple issue rate sources,
   a plurality of destinations,
   one or more nodes forming an asynchronous transfer mode (ATM) network connecting sources to destinations, each node including,
      a forward path for transfer of information in a forward direction toward a destination through the network,
      a return path for returning control signals in a reverse direction through the network toward a source,
      control signal generating means for generating control signals in response to congestion, for each of one or more virtual channels in the network,
      one of said plurality of sources is linked to one of said plurality of destinations through said network by linking forward paths from one or more nodes,
      said one of said plurality of destinations is linked to said one of said plurality of sources through said network by linking return paths from said one or more nodes,
      the control signal generating means in one of said nodes generates said control signals for the virtual channel in response to congestion,
   said multiple issue rate source comprising,
      a modifiable issue rate unit having means to transmit forward information signals at different transmission rates in response to control signals and average rate metering, said issue rate unit having an output for transmitting, for each of one or more virtual channels, at a maximum-channel-peak-cell-rate in the absence of a control signal and at a rate below the maximum-channel-peak-cell-rate for each channel providing a control signal.

57. The multiple issue rate source of claim 56 wherein said issue rate unit includes means for increasing the transmission rate, after decreasing said transmission rate, in response to the absence of control signals.

58. The multiple issue rate source of claim 56 wherein said issue rate unit has means for decreasing said transmission rate exponentially in response to a control signal.

59. The multiple issue rate source of claim 56 wherein said issue rate unit, after decreasing said transmission rate, has means for increasing said transmission rate exponentially in response to the absence of a control signal.

60. The multiple issue rate source of claim 59 wherein the rate of increasing said transmission rate is less than the rate of decreasing said transmission rate.

61. A communication unit for use in an asynchronous transfer mode ATM network where a host unit processes packets for communication over one or more virtual channels in the network, where each packet is segmented into a plurality of associated cells for transmission over the network at a cell clock rate, where each packet has data and control information, and where memory means stores control information and data for packets and for cells associated with the packets for each of the one or more virtual channels, and where constant bit rate information is provided for transmission over one or more of the virtual channels, said communication unit comprising,
   a memory interface for interfacing the communication unit to the memory means,
   a cell interface for interfacing the communication unit to the ATM network, core processor means for controlling the processing of cells for each of the one or more virtual channels, said core processor means including control logic means for controlling the processing of control information and data logic means for controlling the processing of data, said control logic means and said data logic means operating to concurrently process data and control information for sustained transmission of cells in the ATM network up to the cell clock rate for each of the one or more virtual channels, said core processing means including constant bit rate means for selecting constant bit rate information for transmission in said ATM network up to the cell clock rate.

62. A communication system having reactive congestion control comprising, a plurality of sources, each source including a modifiable issue rate unit which transmits forward information signals at different transmission rates in response to congestion signals and includes average rate metering means for insuring that the transmission rate does not exceed an average rate, said issue rate unit decreasing the transmission rate in response to congestion signals, a plurality of destinations, one or more nodes forming an asynchronous transfer mode (ATM) network connecting the sources to the destinations, each node including, a forward path for transfer of information in a forward direction toward a destination through the network, a return path for returning congestion signals in a reverse direction through the network toward a source, congestion signal generating means for generating congestion signals in response to congestion in the node, said network having a plurality of virtual channels where, for each virtual channel, one of said plurality of sources is linked to one of said plurality of destinations through said network by linking forward paths from one or more nodes, and wherein said issue rate unit transmits forward information signals at different transmission rates in response to congestion signals over the virtual channel, said one of said plurality of destinations is linked to said one of said plurality of sources through said network by linking return paths from said one or more nodes, the congestion signal generating means in one of said nodes generates said congestion signals for the virtual channel in response to congestion in said one of said nodes.

63. The system of claim 62 wherein said average rate metering means includes, time interval means for providing an interval output once per time interval, ccumulator means for accumulating a count over a range from a minimum to a maximum and operative to be incremented toward said maximum for each interval output, transmission means for transmitting a cell only when said count is greater than said minimum and when a request to transmit is pending, said transmission means for operative to decrement said count toward said minimum each time a cell is transmitted.

64. A communication system having one or more channels each having reactive control where said system includes, one or more multiple issue rate sources, a plurality of destinations, one or more nodes forming a network connecting sources to destinations, each node including, a path for transfer of information through the network, control signal generating means for generating control signals for one or more signals for one or more channels in response to congestion, for one or more channels in the network, one of said sources linked to one of said plurality of destinations through said network by paths linking one or more nodes, said one or more multiple issue rate sources including for each source, a modifiable issue rate unit having means to transmit forward information signals at different transmission rates in response to said control signals, said issue rate unit having an output for transmitting, for each of one or more channels, at a maximum-channel-peak-cell-rate or at a rate below the maximum-channel-peak-cell rate as a function of the control signals for each channel.

65. The multiple issue rate source of claim 64 wherein said issue rate unit includes means for decreasing the transmission rates below the maximum-channel-peak-cell-rate as a function of the control signals and means for increasing the transmission rates up to the maximum-channel-peak-cell-rate as a function of the absence of the control signals.

66. The multiple issue rate source of claim 64 wherein said issue rate unit has means for decreasing said transmission rate exponentially as a function of the control signals.

67. The multiple issue rate source of claim 64 wherein said issue rate unit, after decreasing said transmission rate, has means for increasing said transmission rate exponentially in response as a functional of the absence of the control signals.

68. The multiple issue rate source of claim 64 wherein the rate of increasing said transmission rate is less than the rate of decreasing said transmission rate.

* * * * *